US010345519B1

(12) United States Patent
Miller et al.

(10) Patent No.: US 10,345,519 B1
(45) Date of Patent: Jul. 9, 2019

(54) INTEGRATED OPTICAL BEAM STEERING SYSTEM

(71) Applicant: Microsoft Technology Licensing, LLC, Redmond, WA (US)

(72) Inventors: Joshua Owen Miller, Woodinville, WA (US); Kai Zang, Redmond, WA (US); Wyatt Owen Davis, Bothell, WA (US); Mohammadamin Eftekhar, Tehran (IR)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/950,440

(22) Filed: Apr. 11, 2018

(51) Int. Cl.

| | |
|---|---|
| ***G02B 6/122*** | (2006.01) |
| ***G02B 6/293*** | (2006.01) |
| ***G02B 6/124*** | (2006.01) |
| *G02B 27/01* | (2006.01) |
| *G02F 1/21* | (2006.01) |
| *G02F 1/225* | (2006.01) |

(52) U.S. Cl.
CPC ........... *G02B 6/1225* (2013.01); *G02B 6/124* (2013.01); *G02B 6/29355* (2013.01); *G02B 27/0172* (2013.01); *G02F 1/225* (2013.01); *G02F 2001/212* (2013.01)

(58) Field of Classification Search
CPC .......................... G02B 6/1225; G02B 27/0172
See application file for complete search history.

(56) References Cited

U.S. PATENT DOCUMENTS 6,542,682 B2 * 4/2003 Cotteverte ............. B82Y 20/00 385/125
7,215,861 B2 * 5/2007 Sakai ..................... B82Y 20/00 385/129

(Continued)

FOREIGN PATENT DOCUMENTS

CN 107785776 A * 3/2018 ............... H01S 5/22
KR 2006033145 A * 4/2006 ............... G02B 6/02

OTHER PUBLICATIONS

Yao Zhang and Baojun Li, "Photonic crystal-based bending waveguides for optical interconnections," Opt. Express 14, 5723-5732 (2006).*

*Primary Examiner* — Daniel Petkovsek
(74) *Attorney, Agent, or Firm* — Mark K. Young; Mayer & Williams PC

(57) ABSTRACT

An integrated optical beam steering system includes a photonic crystal nanostructure having a plurality of nanoelements, an input surface to receive light from an imager, and a concave output surface which maintains a desired field of view with suitable coupling efficiency. Parameters of the nanoelements are configured to give rise to a photonic bandgap for a predetermined range of wavelengths. Waveguides are disposed in the nanostructure which comprise negative space formed by the absence of nanoelements and are employed to generate a propagating band within the photonic bandgap. The respective waveguides have inputs disposed on the input surfaces of the nanostructure where light propagates in a respective waveguide in total internal reflection. The respective waveguides further have outputs that have paths with curved portions located in the nanostructure and the outputs are configured normal to the concave output surface.

7 Claims, 20 Drawing Sheets

(56) References Cited

U.S. PATENT DOCUMENTS

| | | | | |
|---|---|---|---|---|
| 7,515,790 | B2 * | 4/2009 | Choi | B82Y 20/00 359/831 |
| 8,434,909 | B2 * | 5/2013 | Nichol | G02B 6/0018 362/296.01 |
| 8,885,996 | B2 * | 11/2014 | Li | G02B 6/29308 385/31 |
| 9,759,919 | B2 | 9/2017 | Travis et al. | |
| 2010/0046901 | A1 * | 2/2010 | Stoeferle | B82Y 20/00 385/129 |
| 2010/0225603 | A1 * | 9/2010 | Shimizu | G02B 6/12004 345/173 |

* cited by examiner

1800

2600

3100

3300

INTEGRATED OPTICAL BEAM STEERING SYSTEM

BACKGROUND

Mixed-reality computing devices, such as wearable head mounted display (HMD) systems and mobile devices (e.g. smart phones, tablet computers, etc.), may be configured to display information to a user about virtual and/or real objects in a field of view of the user and/or a field of view of a camera of the device. For example, an HMD device may be configured to display, using a see-through display system, virtual environments with real-world objects mixed in, or real-world environments with virtual objects mixed in. Similarly, a mobile device may display such information using a camera viewfinder window.

SUMMARY

An integrated optical beam steering system is configured in three stages to provide beam steering for image light from an imager (e.g., laser, light emitting diode, or other light source) to downstream elements in a display system such as an exit pupil expander (EPE) in a mixed-reality computing device. The first stage includes a multi-level cascaded array of optical switches that are configurable to spatially route image light over a first dimension of a two-dimensional (2D) field of view (FOV) of the display system. The second waveguiding stage transfers the image light along preformed waveguides to a collimator in the third stage which is configured to collimate the image light along the first dimension of the FOV (e.g., horizontal). The waveguiding and collimating stages may be implemented using lightweight photonic crystal nanostructures.

In various illustrative embodiments, each optical switch in the array is configured using a Mach-Zehnder interferometer that is located between a pair of 3 dB optical couplers to form a 2×2 switch with two inputs and two outputs. Voltage from an external source applied to an arm of the Mach-Zehnder interferometer induces a phase change in the light propagating in the arm so that light from one input can be distributed to both outputs in any ratio. For a cascaded array of N optical switches in a binary tree arrangement, an input optical beam from the imager can be routed to any of $2^N$ output ports, responsively to a suitable control signal. Optical switches in the array can also be operated as variable optical attenuators to provide additional dynamic range and control of output illumination amplitude from the beam steering system.

For the waveguiding structure in the second stage, parameters including diameter and pitch that are associated with elements (e.g., cylindrical rods arranged in a lattice) in the photonic crystal nanostructure are selected to give rise to a photonic bandgap effect. The layout of elements is manipulated in the nanostructure (e.g., by removing a row of rods in the lattice) to create a propagating band within the bandgap to thereby provide preformed waveguides for image light within a predetermined range of wavelengths.

The preformed waveguides propagate light along curved paths with low bending loss and crosstalk. The curved paths enable the waveguide outputs to be configured along a curve to maximize the FOV of in-coupled light in the downstream components of the display system. Elements in the photonic crystal nanostructure of the waveguiding structure that interface with the optical switch array may be configured with various tapered geometrical layouts to provide impedance matching to minimize coupling losses between the stages.

The collimator in the third stage includes elements in a lattice configuration within the photonic crystal nanostructure that have varying diameters to mimic the properties of a Luneburg lens having a gradient refractive index. Image light output from the waveguides is directly coupled at points along the perimeter of the collimator and mapped to planewaves. The collimator may have a semi-circular shape to accommodate the curved waveguides and present a concave surface relative to an in-coupling diffracting element located at the waveguide. The collimator may further be operative with a cylindrical lens that is configured to provide optical collimation for the second dimension of the FOV (e.g., vertical).

The integrated optical beam steering system may be configured to support a fast, or horizontal scan when 2D raster scanning techniques are utilized in the display system. Thus, the beam steering system may be operatively coupled with a slow, or vertical scan component such as a micro-electro mechanical system (MEMS) scanner. The integrated optical beam steering system may also be configured as a stack of photonic crystal plates, in which each plate handles a particular wavelength of image light. For example, three plates may respectively handle red, green, and blue (RGB) image light from one or more sources so the display system can show images across a full color spectrum.

The integrated optical beam steering system advantageously provides effective beam steering in a lightweight and compact form factor for wearable and other applications where it is desirable to reduce weight and bulk. The system can be implemented with fewer moving parts to enhance overall reliability while meeting requirements for high resolution and a large FOV to provide more immersive and compelling user experiences.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Beam steering is a key component in current conventional mixed-reality systems. Typical methods to steer beams in horizontal and vertical directions utilize a system of MEMS mirrors or miniature display systems. To reach a better resolution and larger field of view both these systems need to become prohibitively bulkier and heavier. Both these methods suffer from limitations in scanning angles and also need a number of optical lenses and mirrors for relaying and collimating the beam. The architecture that is put forward here significantly reduces the need for optics and is considerably lighter and smaller. This architecture is based on preformed waveguides, as a means for beam steering, in conjunction with an optical routing system and an integrated photonic crystal collimator.

Figure 1:
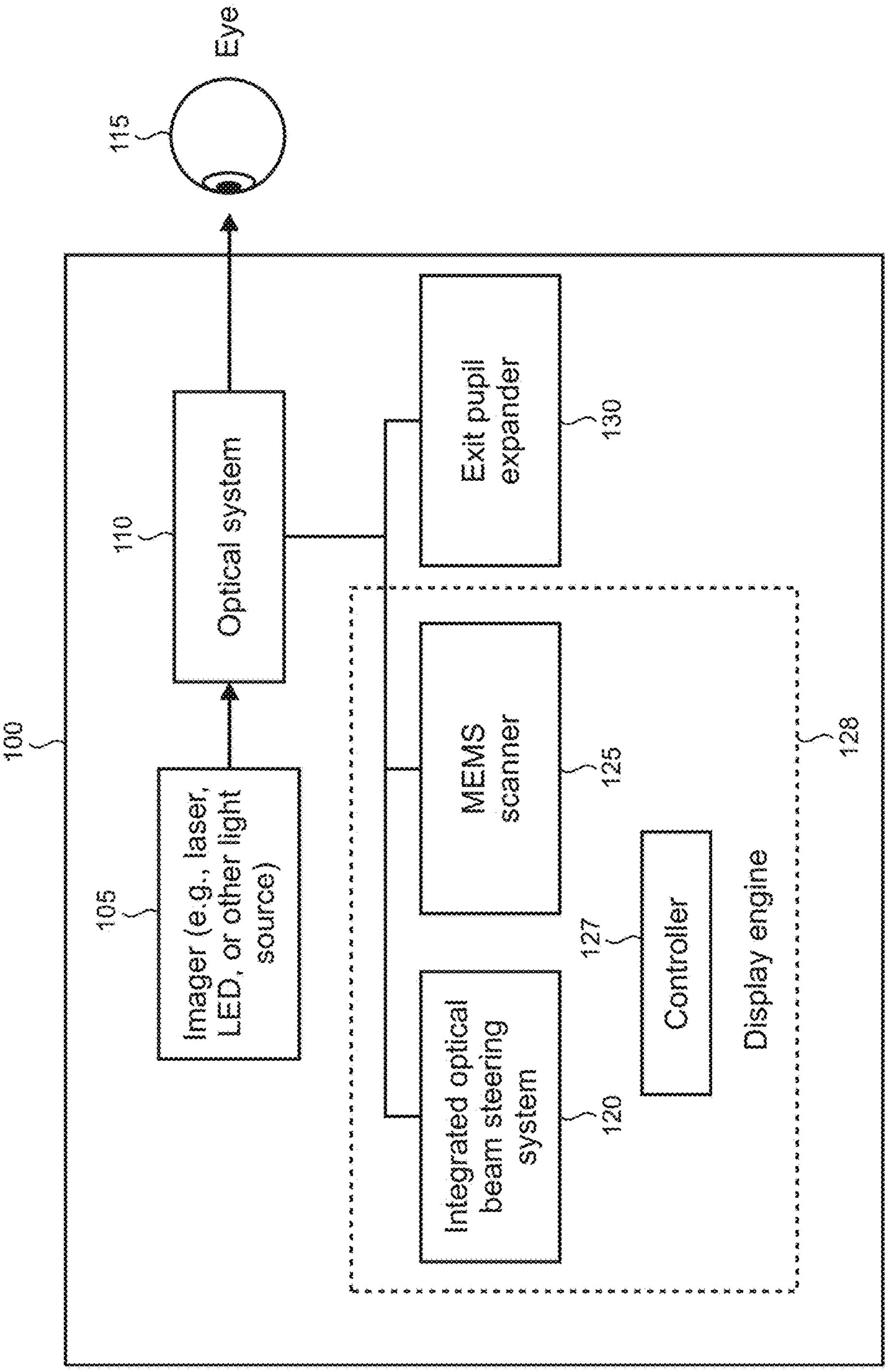
FIG. 1 shows a block diagram of an illustrative near-eye display system.

Turning now to the drawings, FIG. 1 shows a block diagram of an illustrative near-eye optical display system 100 which may include the present integrated optical beam steering system. Near-eye optical display systems are often used, for example, in head mounted display (HMD) devices in industrial, commercial, and consumer applications. Other devices and systems may also use near-eye display systems, as described below. The near-eye optical display system 100 is illustratively utilized to provide context and demonstrate various features and aspects of the present integrated optical beam steering system. However, the integrated optical beam steering system is not limited to near-eye displays.

System 100 may include one or more imagers (representatively indicated by reference numeral 105) (i.e., optical light sources) that work with an optical system 110 to deliver images as a virtual display to a user's eye 115. The imager 105 may include, for example, RGB (red, green, blue) light emitting diodes (LEDs), micro-LEDs, superluminescent LEDs (SLEDs), LCOS (liquid crystal on silicon) devices, OLED (organic light emitting diode) arrays, lasers, laser diodes, or any other suitable displays or micro-displays operating in transmission, reflection, or emission. The imager 105 may include or incorporate an illumination unit and/or light engine (not shown) that may be configured to provide illumination in a range of wavelengths and intensities in some implementations.

In this illustrative example, the optical system 110 includes an integrated optical beam steering system 120, MEMS device (referred to here as a MEMS scanner 125), and an exit pupil expander (EPE) 130. The combination of the integrated optical beam steering system 120 and MEMS scanner 125 may be referred to as a display engine 128 that is configured to provide an entrance pupil to the input of the EPE over the entire field of view (FOV). The display engine may include various non-optical elements such as a controller 127, as described in more detail below in the text accompanying FIGS. 13 and 14.

In a near-eye optical display system the imager does not actually shine the images on a surface such as a glass lens to create the visual display for the user. This is not feasible because the human eye cannot focus on something that is that close. Rather than create a visible image on a surface, the near-eye optical display system 100 uses pupil forming optics in the EPE to form a pupil and the eye 115 acts as the last element in the optical chain and converts the light from the pupil into an image on the eye's retina as a virtual display.

Figure 2:
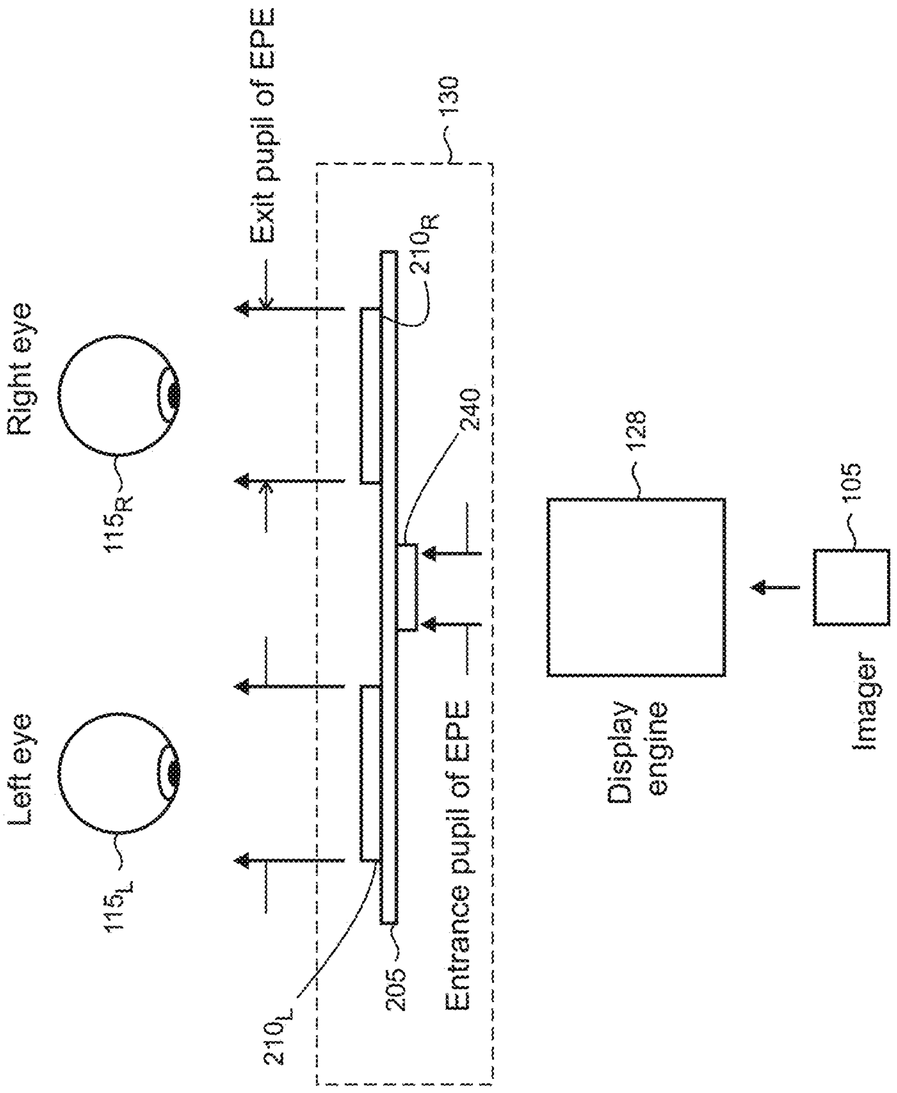
FIG. 2 is a plan view of an illustrative exit pupil expander (EPE) in operative relationships with an integrated optical beam steering system and the eyes of a display system user.

FIG. 2 is a top view of the EPE 130 showing operative relationships with the integrated optical beam steering system 120 and eyes 115. As shown, the EPE includes a waveguide 205 which facilitates light transmission between the imager 105 and eyes 115. One or more waveguides can be utilized in the near-eye optical display system because they are transparent and because they are generally small and lightweight (which is desirable in applications such as HMD devices where size and weight are generally sought to be minimized for reasons of performance and user comfort). For example, the waveguide 205 can enable the imager 105 to be located out of the way, for example, on the side of the user's head or near the forehead, leaving only a relatively small, light, and transparent waveguide optical element in front of the eyes.

Figure 3:
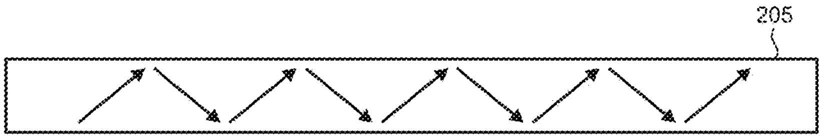
FIG. 3 shows propagation of light by total internal reflection (TIR) in a waveguide.

In typical implementations, the waveguide 205 operates using a principle of total internal reflection (TIR), as shown in FIG. 3, so that light can be propagated and coupled among the various optical elements in the system 100. The angle of incidence for light impinging an interface of any two media with differing refractive indices will determine whether it is reflected or refracted according to Snell's law. If the light hits the interface at any angle larger than a critical angle, it is not in-coupled to the second medium and instead is reflected back into the first medium (e.g., as in TIR). Accordingly, the optical components in the near-eye display system are typically configured to enable light to be efficiently propagated throughout the system over the entire FOV with minimal leakage of light. For example, as described below in the text accompanying FIG X, the collimator of the integrated optical beam steering system has a semi-circular geometry to maximize in-coupling efficiency at a downstream diffractive grating across the FOV.

Returning to FIG. 2, EPE 130 receives an input comprising one or more optical beams from the imager 105 and through the display engine 128 as an entrance pupil. The EPE produces one or more output optical beams with expanded exit pupil relative to the input. The display engine 128 is described in more detail below and replaces magnifying and/or collimating optics that are typically used in conventional display systems. The expanded exit pupil typically facilitates a virtual display to be sufficiently sized to meet the various design requirements such as image resolution, field of view, and the like of a given optical system while enabling the imager and associated components to be relatively light and compact.

The EPE 130 is configured, in this illustrative example, to provide binocular operation for both the left and right eyes which may support stereoscopic viewing. Components that may be utilized for stereoscopic operation such as scanning mirrors, lenses, filters, beam splitters, MEMS devices, imagers, or the like are not shown in FIG. 2 for sake of clarity in exposition. The EPE 130 utilizes two out-coupling gratings, $\mathbf{210}_L$ and $\mathbf{210}_R$ that are supported on the waveguide 205 and one or more central in-coupling gratings 240. The in-coupling and out-coupling gratings may be configured using multiple diffractive optical elements (DOEs) and may further include one or more intermediate DOEs as described below in the text accompanying FIG. 10. While the EPE 130 is depicted as having a planar configuration, other shapes may also be utilized including, for example, curved or partially spherical shapes, in which case the gratings disposed thereon are non-co-planar.

Figure 4:
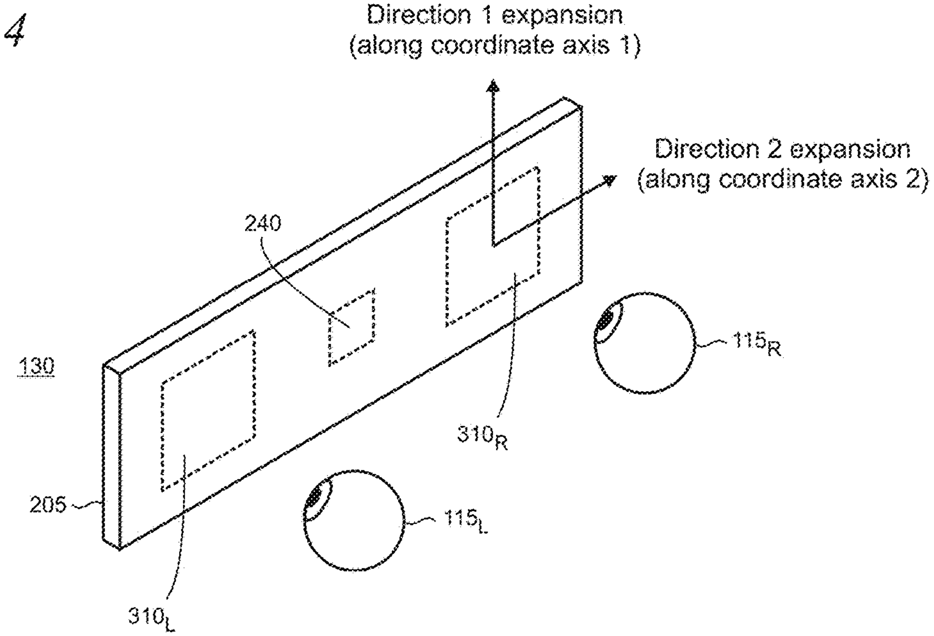
FIG. 4 shows a view of the illustrative EPE in which the exit pupil is expanded along two directions.
Figure 5:
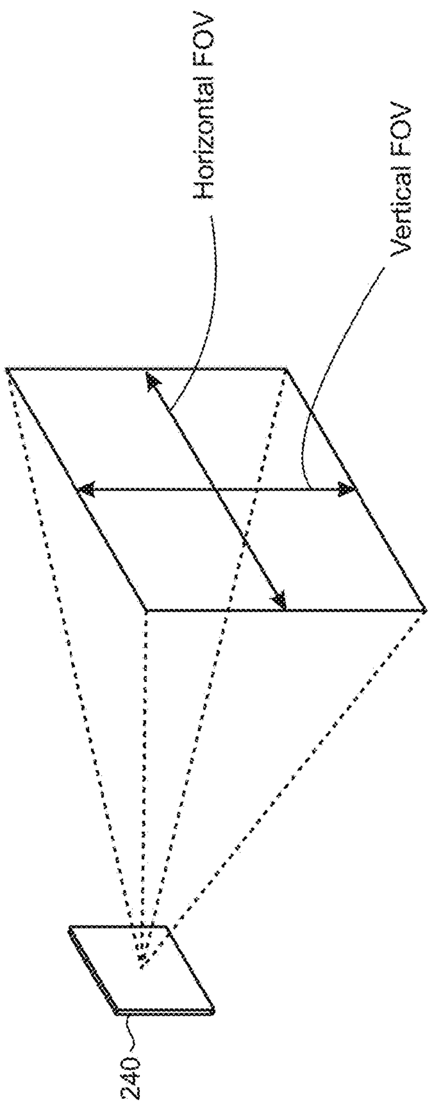
FIG. 5 shows an illustrative input pupil to an exit pupil expander in which a field of view (FOV) is described by horizontal and vertical angles.

As shown in FIG. 4, the EPE 130 may be configured to provide an expanded exit pupil in two directions (i.e., along each of a first and second coordinate axis). As shown, the exit pupil is expanded in both the vertical and horizontal directions. It may be understood that the terms "left," "right," "up," "down," "direction," "horizontal," and "vertical" are used primarily to establish relative orientations in the illustrative examples shown and described herein for ease of description. These terms may be intuitive for a usage scenario in which the user of the near-eye optical display device is upright and forward facing, but less intuitive for other usage scenarios. The listed terms are not to be construed to limit the scope of the configurations (and usage scenarios therein) of near-eye optical display features utilized in the present arrangement. The entrance pupil to the EPE 130 at the in-coupling grating 240 is generally described in terms of FOV, for example, using horizontal FOV and vertical FOV, as shown in FIG. 5.

Figure 6:
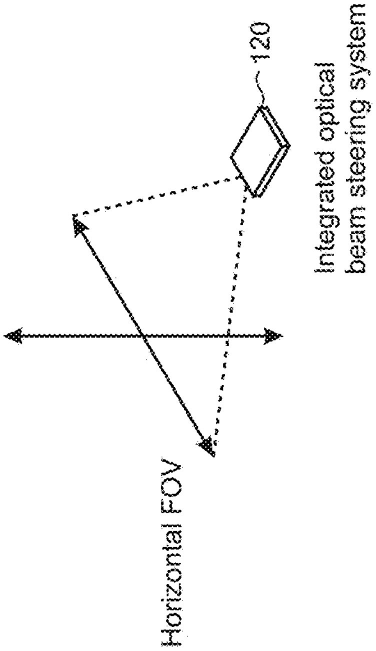
FIG. 6 shows a plan view of an illustrative integrated optical beam steering system that directs virtual image light for the horizontal FOV of the input pupil to the EPE.
Figure 7:
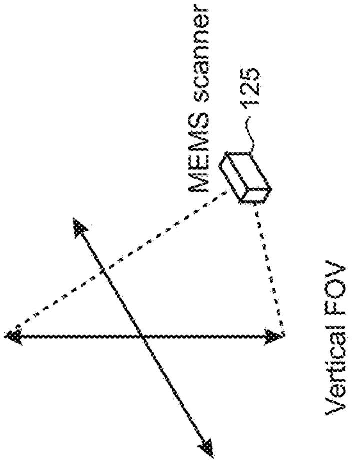
FIG. 7 shows an illustrative micro-electro mechanical system (MEMS) scanner that delivers virtual image light for the vertical FOV of the input pupil to the EPE.

In the near-eye system 100 (FIG. 1), the integrated optical beam steering system 120 is configured to direct virtual image light from the imager 105 over the horizontal FOV of the entrance pupil to the EPE 130, as shown in FIG. 6. The MEMS scanner 125 directs virtual image light over the vertical FOV, as shown in FIG. 7. The integrated optical beam steering system and MEMS scanner thus operate in serial combination to provide virtual images over the entire extent of the FOV, for example, utilizing raster scanning techniques. The integrated optical beam steering operates over the horizontal, or fast scan axis of the 2D display system to present a row of pixels in the display. The MEMS scanner 125 operates on a slow scan axis to present the rows of pixels along the vertical dimension of the display.

The MEMS scanner 125 may comprise a reflective scanning plate configured to scan one or more beams that comprise image light for virtual images. MEMS scanners may also be referred to as beam deflectors. The scanning plate comprises a reflective surface (e.g., mirror) that is used to scan an impinging beam over an FOV which is movably suspended to one or more structures (not shown) in the scanner device using lateral torsional flexures, or other suitable arrangements such as bending flexures. The reflective surface may include a plated reflective metal such as gold or aluminum, a dielectric stack, bare silicon, or other materials depending upon wavelength and other design criteria.

Various actuation technologies (not shown in the drawings) for the MEMS scanner 125 may be utilized depending on the needs of a particular implementation. Electrocapacitive drive scanners include both rear drive pad and comb drive architectures. Magnetic drive scanners include moving coil and moving magnet types. Other technologies include thermal, piezoelectric, and impact motor drives. Electrocapacitive drive systems may be referred to as electrostatic and bending flexures may be referred to as cantilever arms. The MEMS scanner 125 may be operated non-resonantly, and resonantly in some cases, which may reduce power consumption. In this illustrative example, the MEMS scanner 125 is configured as a single axis (i.e., one dimensional) scanner.

In the display engine 128 (FIG. 1), the integrated optical beam steering system 120 is operated to perform a fast scan, while the MEMS scanner 125 is operated to perform a slow scan. Typically, the fast scan comprises sweeping back and forth horizontally across the FOV while the slow scan indexes down the FOV vertically by one or two lines. The display engine may be configured to perform progressive scanning in which the beams of image light may be scanned unidirectionally or bidirectionally depending upon the desired resolution, frame rate, and system or engine capabilities.

The integrated optical beam steering system 120 typically operates at a relatively high scan rate while the slow scan MEMS scanner 125 operates at a scan rate equal to the video frame rate. In some applications, the MEMS scanner 125 may use a substantially sawtooth pattern, scanning progressively down the frame for a portion of a frame and then flying back to the top of the frame to start over. In other applications, interleaved sawtooth scanning, triangular wave scanning, sinusoidal scanning, and other waveforms are used to drive one or both axes.

Depending on application requirements, the fast scan and slow scan directions can be reversed. However, such convention is not limiting and some embodiments of the present integrated optical beam steering system may be implemented with fast and slow scans in various other directions to meet the requirements of a particular application.

Figure 8:
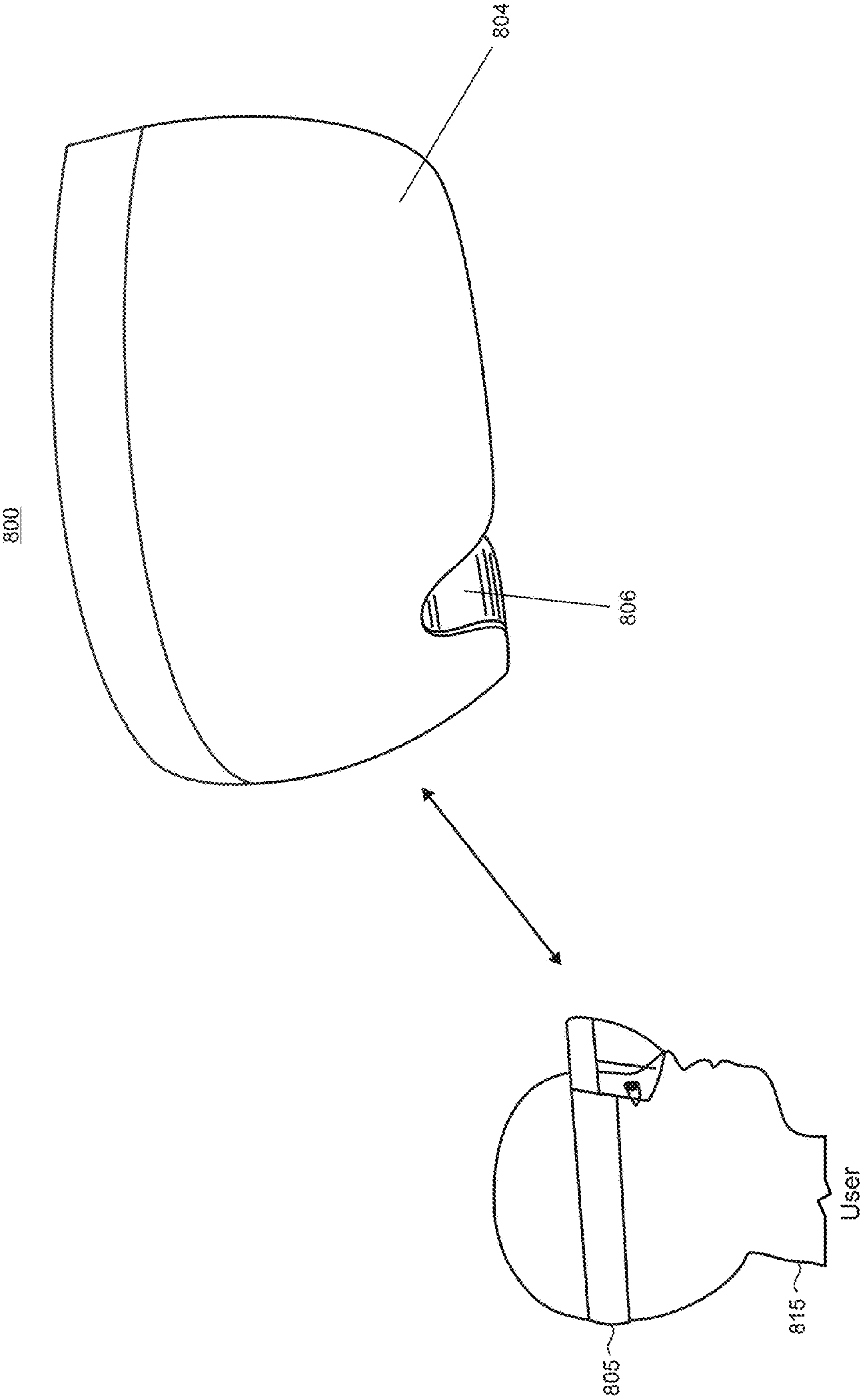
FIG. 8 shows a pictorial front view of a sealed visor that may be used as a component of a head mounted display (HMD) device.

FIG. 8 shows an illustrative example of a visor 800 that incorporates an internal near-eye optical display system that is used in a head mounted display (HMD) device 805 application worn by a user 815. The visor 800, in this example, is sealed to protect the internal near-eye optical display system. The visor 800 typically interfaces with other components of the HMD device 805 such as head mounting/retention systems and other subsystems including sensors, power management, controllers, etc., as illustratively described in conjunction with FIGS. 31 and 32. Suitable interface elements (not shown) including snaps, bosses, screws and other fasteners, etc. may also be incorporated into the visor 800.

The visor 800 includes see-through front and rear shields, 804 and 806 respectively, that can be molded using transparent materials to facilitate unobstructed vision to the optical displays and the surrounding real-world environment. Treatments may be applied to the front and rear shields such as tinting, mirroring, anti-reflective, anti-fog, and other coatings, and various colors and finishes may also be utilized. The front and rear shields are affixed to a chassis 905 shown in the disassembled view in FIG. 9.

The sealed visor 800 can physically protect sensitive internal components, including an instance of a near-eye optical display system 902 (shown in FIG. 9), when the HMD device is used in operation and during normal handling for cleaning and the like. The near-eye optical display system 902 includes left and right waveguide displays 910 and 915 that respectively provide virtual world images to the user's left and right eyes for mixed- and/or virtual-reality applications. The visor 800 can also protect the near-eye optical display system 902 from environmental elements and damage should the HMD device be dropped or bumped, impacted, etc.

Figure 9:
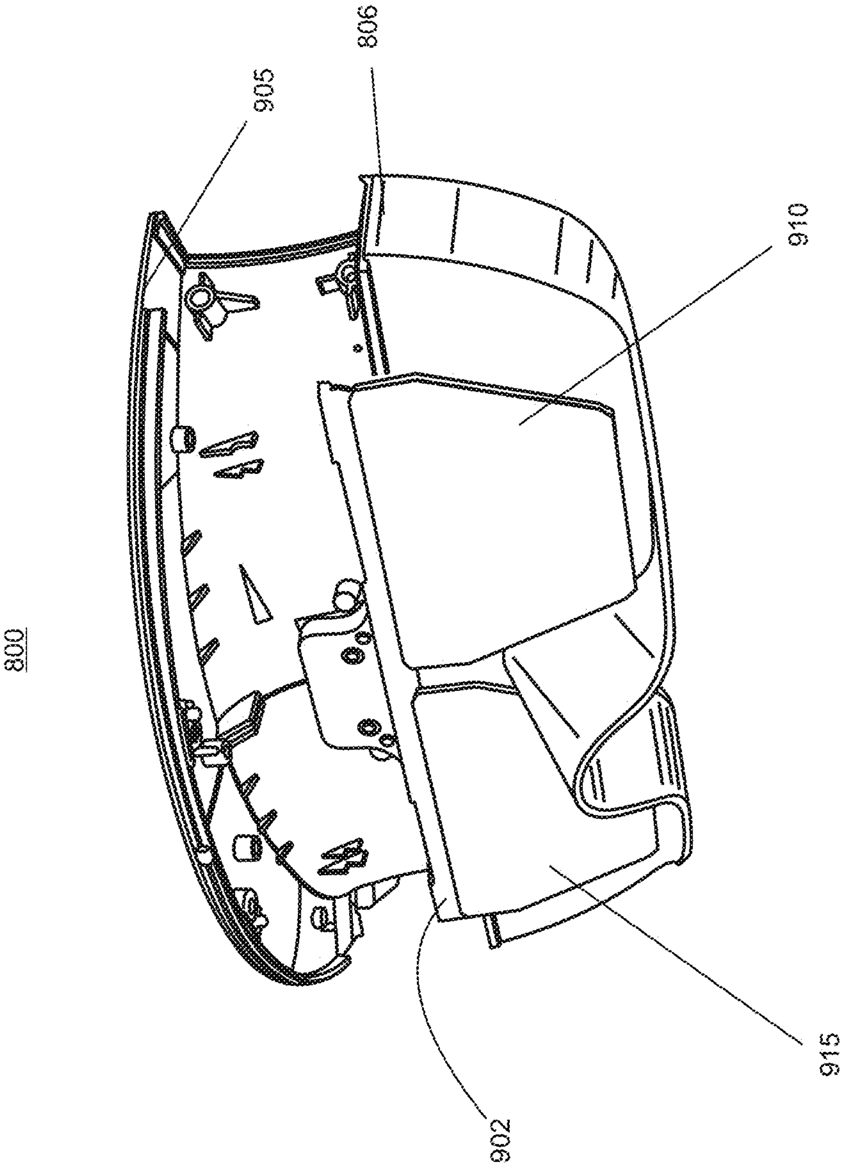
FIG. 9 shows a partially disassembled view of the sealed visor.

As shown in FIG. 9, the rear shield 806 is configured in an ergonomically suitable form to interface with the user's nose, and nose pads and/or other comfort features can be included (e.g., molded-in and/or added-on as discrete components). The sealed visor 800 can also incorporate some level of optical diopter curvature (i.e., eye prescription) within the molded shields in some cases.

Figure 10:
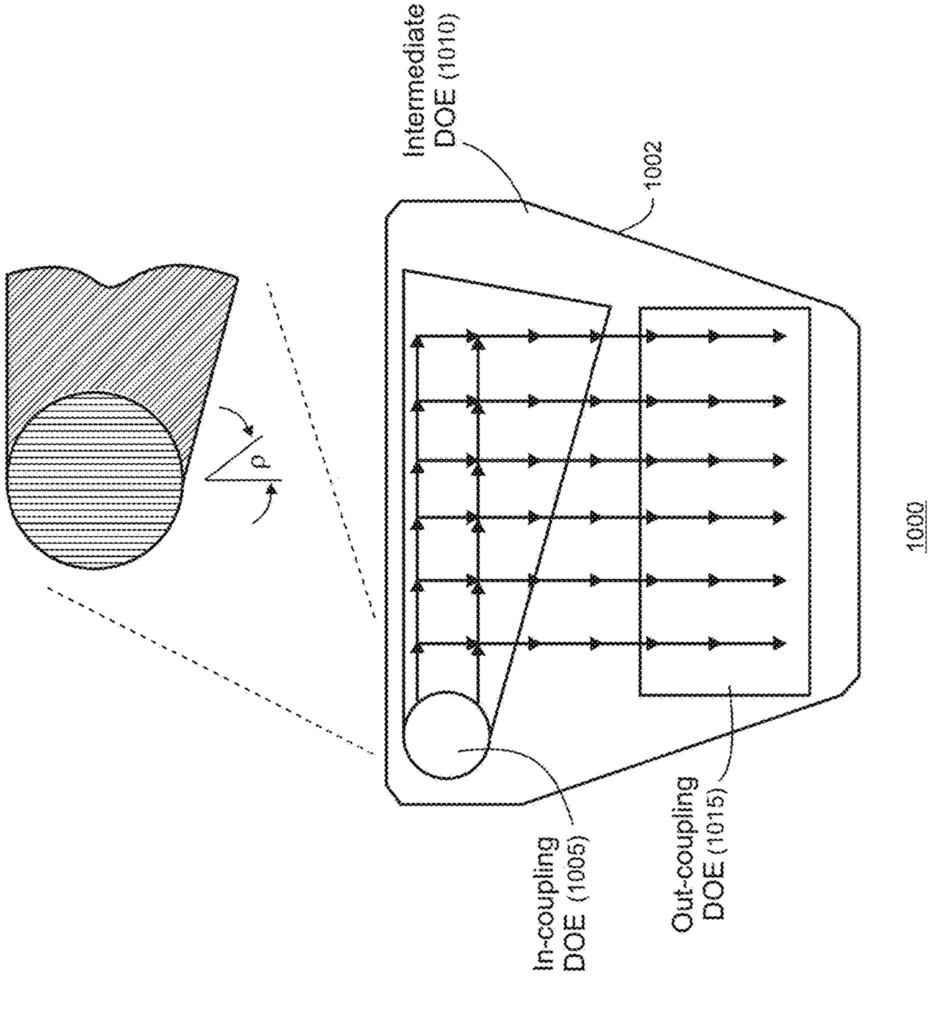
FIG. 10 shows an illustrative arrangement of three diffractive optical elements (DOEs) integrated with a waveguide and configured for in-coupling, exit pupil expansion in two directions, and out-coupling.

FIG. 10 shows an illustrative waveguide display 1000 having three DOEs that may be used with, or incorporated as a part of, a see-through waveguide 1002 to provide in-coupling, expansion of the exit pupil in two directions, and out-coupling. The waveguide display 1000 may be utilized as an EPE that is included in the near eye display system 902 (FIG. 9) to provide virtual world images to one of the user's eyes. Each DOE is an optical element comprising a periodic structure that can modulate various properties of light in a periodic pattern such as the direction of optical axis, optical path length, and the like. The structure can be periodic in one dimension such as one-dimensional (1D) grating and/or be periodic in two dimensions such as two-dimensional (2D) grating. DOEs may be implemented using surface relief gratings (SRGs) in typical implementations.

The waveguide display 1000 includes an in-coupling DOE 1005, an out-coupling DOE 1015, and intermediate DOE 1010 that couples light between the in-coupling and out-coupling DOEs. The in-coupling DOE 1005 is configured to couple image light comprising one or more imaging beams from an imager 105 (FIG. 1) into a waveguide 1002. The intermediate DOE 1010 expands the exit pupil in a first direction along a first coordinate axis, and the out-coupling DOE 1015 expands the exit pupil in a second direction along a second coordinate axis and couples light out of the waveguide to the user's eye.

The angle ρ is a rotation angle between the periodic lines of the in-coupling DOE 1005 and the intermediate DOE 1010 as shown in the enlarged detail in the drawing (the grating lines are illustrative and do not indicate scale, position, or configuration). As the light propagates in the intermediate DOE (horizontally from left to right in the drawing), it is also diffracted (in the downward direction) to the out-coupling DOE 1015. It may be appreciated that other numbers and arrangements of DOEs may be utilized to meet the needs of a particular implementation.

Figure 11:
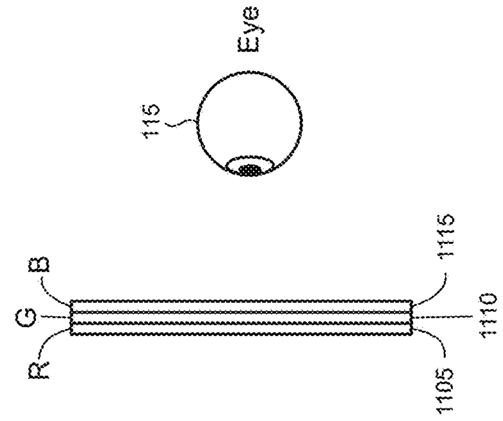
FIG. 11 shows an illustrative stack of three waveguides with integrated DOEs in which each waveguide handles a different color in an RGB (red, green, blue) color space.

FIG. 11 shows an illustrative stack 1100 of three waveguides with integrated DOEs in a waveguide display in which each waveguide 1105, 1110, and 1115 handles a different color in the RGB (red, green, blue) color space. The color order within the stack can vary by implementation and other color spaces may also be used. Use of the waveguide stack enables virtual images to be guided to the eye 115 across a full-color spectrum. In alternative implementations, stacks with more or fewer waveguides can be utilized, for example, for monochromatic and reduced-color spectrum applications. A single plate may be used in some applications, while other applications can use other plate counts.

Figure 12:
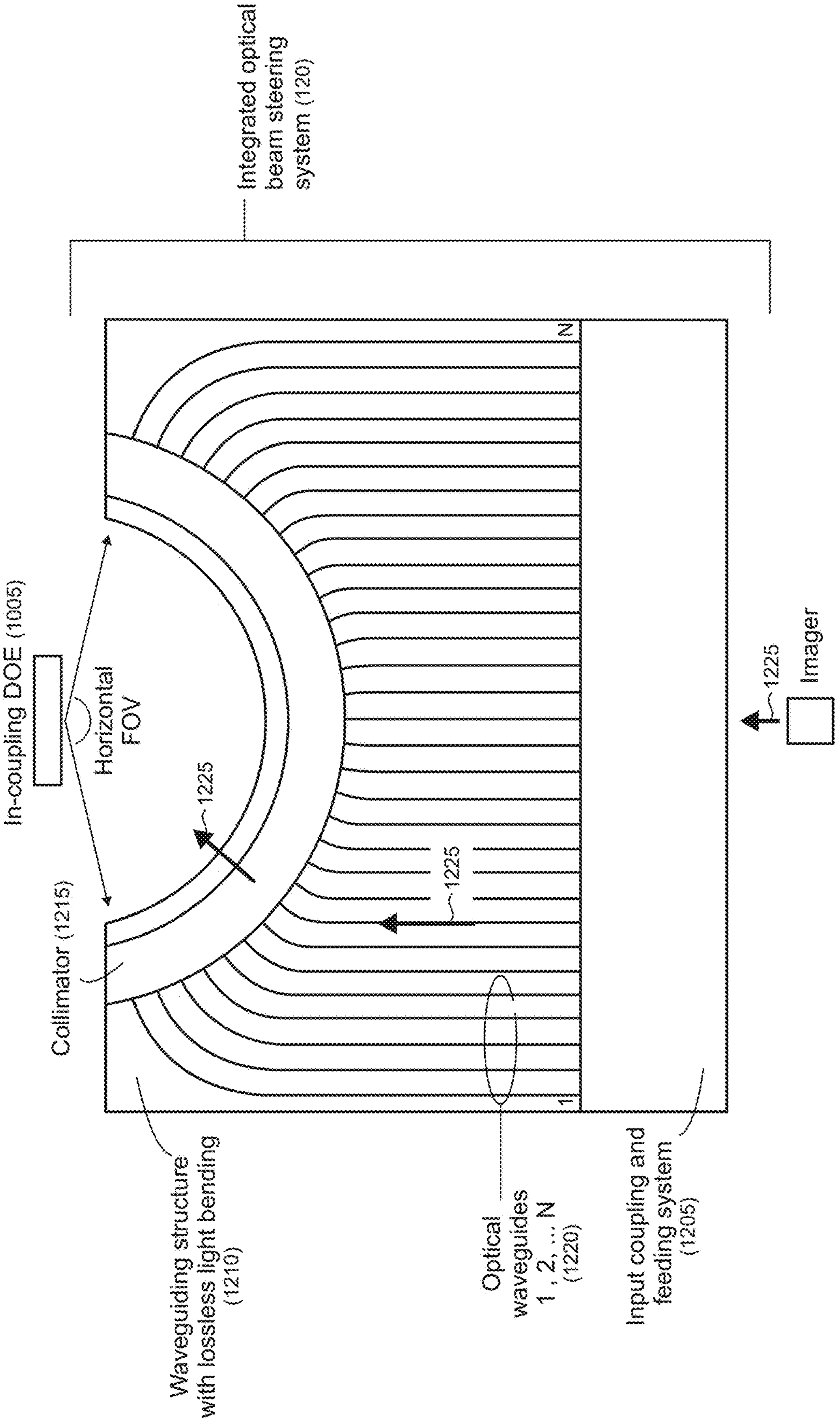
FIG. 12 shows an illustrative integrated optical beam steering system.

FIG. 12 shows illustrative components of the integrated optical beam steering system 120 which is configured in stages including an input coupling and feeding system 1205, a waveguiding structure with lossless light bending 1210, and a collimator 1215 having a semi-circular shape. As shown, the waveguiding structure 1210 includes 1, 2 . . . N waveguides 1220 which are adapted to guide respective portions of virtual images generated by the imager. The integrated optical beam steering system is configured to steer virtual image light from the imager 105 to the in-coupling DOE 1005 across the horizontal FOV, as representatively indicated by arrows 1225.

Figure 13:
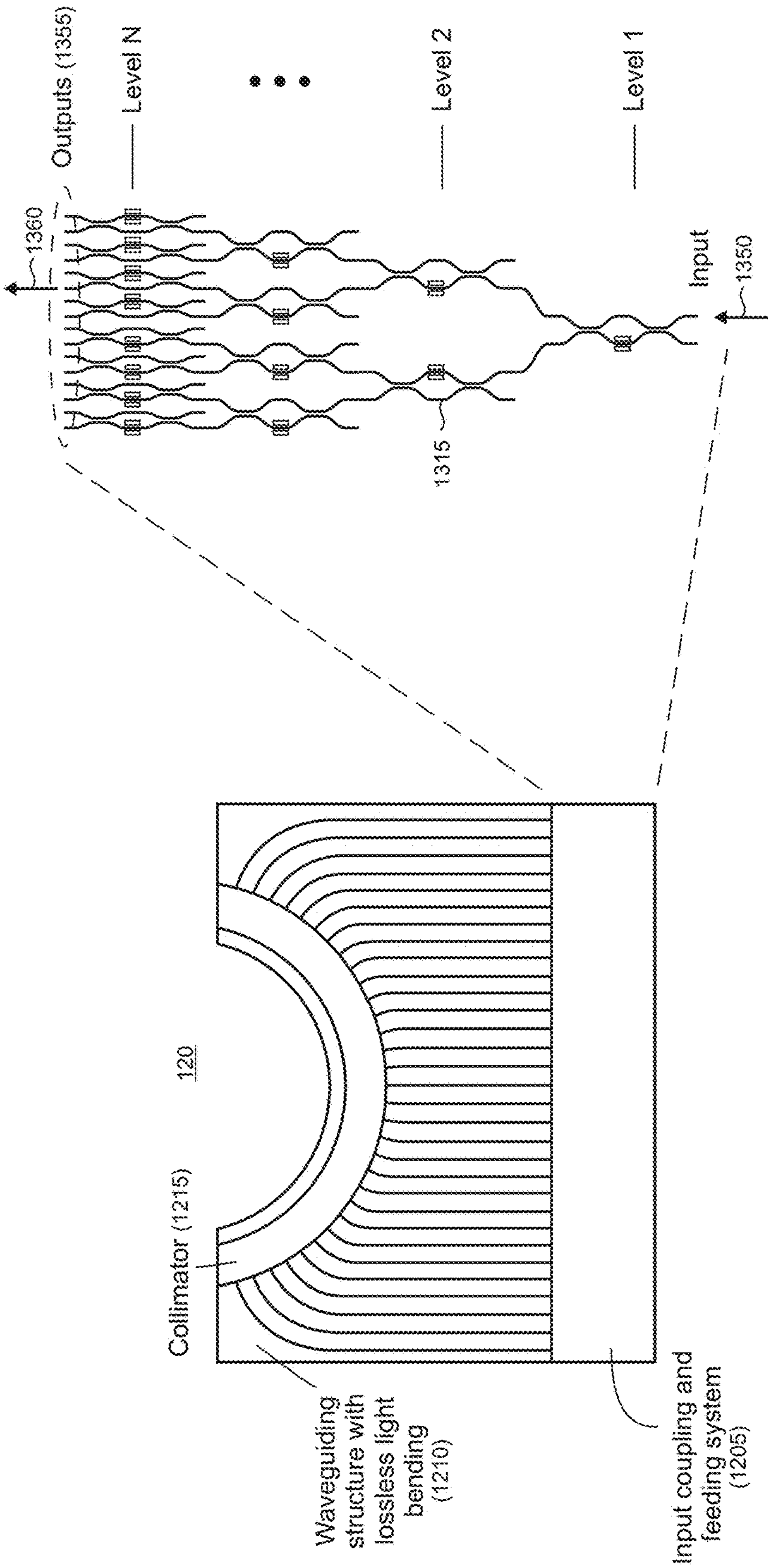
FIG. 13 shows an illustrative input coupling and feeding system that includes a multi-level optical switch cascade.

The input coupling and feeding system 1205 comprises a spatially cascaded array 1300 of optical switches as shown in FIG. 13. The array includes multiple levels of 2×2 optical switches (representatively indicated by reference numeral 1315). Thus, for N levels, a single optical input 1350 can be switched to various ones of the optical outputs 1355, as representatively indicated by the output signal 1360. The optical outputs are spatially distributed in the input coupling and feeding system to couple to respective ones of the optical waveguides 1220 (FIG. 12) in the waveguiding structure 1210.

Figure 14:
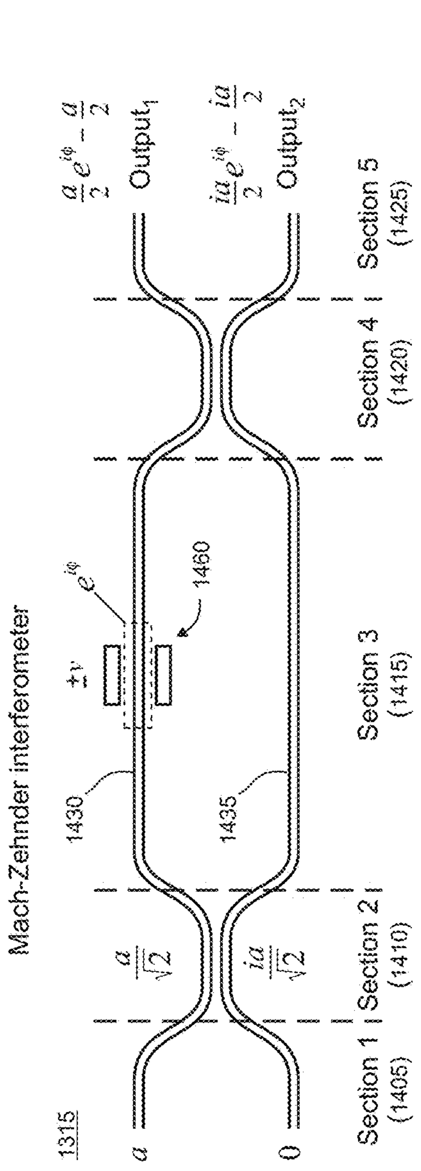
FIG. 14 shows an illustrative optical switch comprising a Mach-Zehnder interferometer.

FIG. 14 shows an illustrative 2×2 optical switch 1315 having two arms or pathways 1430 and 1435 which, in this particular illustrative example, is implemented using a Mach-Zehnder interferometer and two directional 3 dB couplers. In the drawing, inputs are located on the left and outputs on the right. The switch has five sections, respectively indicated by reference numerals 1405, 1410, 1415, 1420, and 1425. Section 1 includes inputs to the optical switch. Sections 2 comprises a directional 3 dB coupler configured to enable light at an input to propagate in equal amounts to each interferometer arm 1430 and 1435 in the optical switch. Thus, each interferometer arm carries 50 percent of the total input power.

Section 3 includes the Mach-Zehnder interferometer that is located between the two 3 dB couplers in Sections 2 and 4. As indicated by reference numeral 1460, application of a voltage v across one of the two interferometer arms in Section 3 (in this example, the upper arm 1430, as shown), causes the refractive index of the waveguide material to be altered to thereby trigger a phase shift of the propagating electromagnetic wave. The applied voltage may be tuned so the light switches between the two output ports in Section 5.

Figure 15:
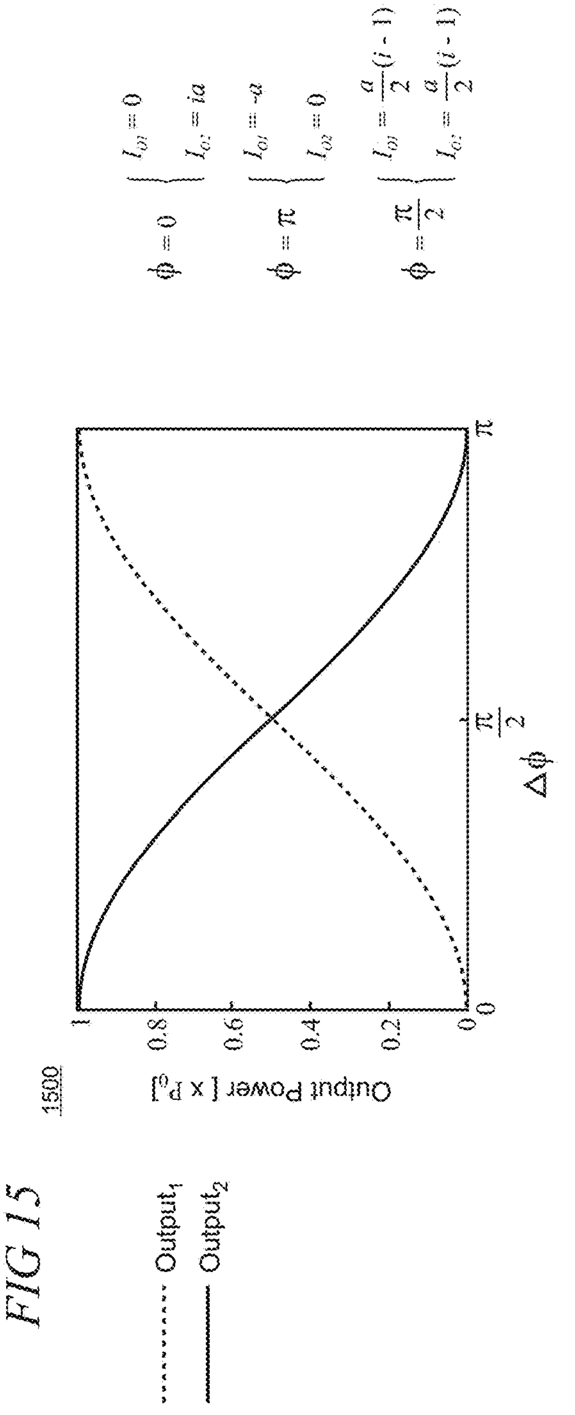
FIG. 15 is an illustrative graph of output power versus phase difference for each arm of the optical switch.

Alternatively, the applied voltage may be tuned to create a phase difference between the propagating waves in the upper and lower interferometer arms. The two waves combine again in the second directional coupler in Section 4. The phase difference created by the applied voltage results in amplitude modulation in which the output at the ports can be varied in any ratio, as shown in graph 1500 in FIG. 15. Thus, one or more of the optical switches in the array may be configured to operate as an optical attenuator. This may advantageously enable enhanced dynamic range and controllability of output illumination amplitude from the display engine.

By applying a suitable voltage signal to a given optical switch in the cascaded array 1300 (FIG. 13), power may be distributed arbitrarily among the output ports. Thus, a binary tree can be formed in the array so that the output of each optical switch in a given level is fed as an input signal into the next level. By a simple calculation for cascading N levels, the input signal can be rerouted to any of $2^N$ output ports. For example, the controller 127 (FIG. 1) may provide suitable control signals to drive the cascaded array of optical switches. In operative combination with the MEMS scanner 125, and the other stages in the integrated optical beam steering system, the array of optical switches provides an entrance pupil to the EPE 130 over the extent of the FOV in both horizontal and vertical directions, for example, using raster scanning techniques.

Figure 16:
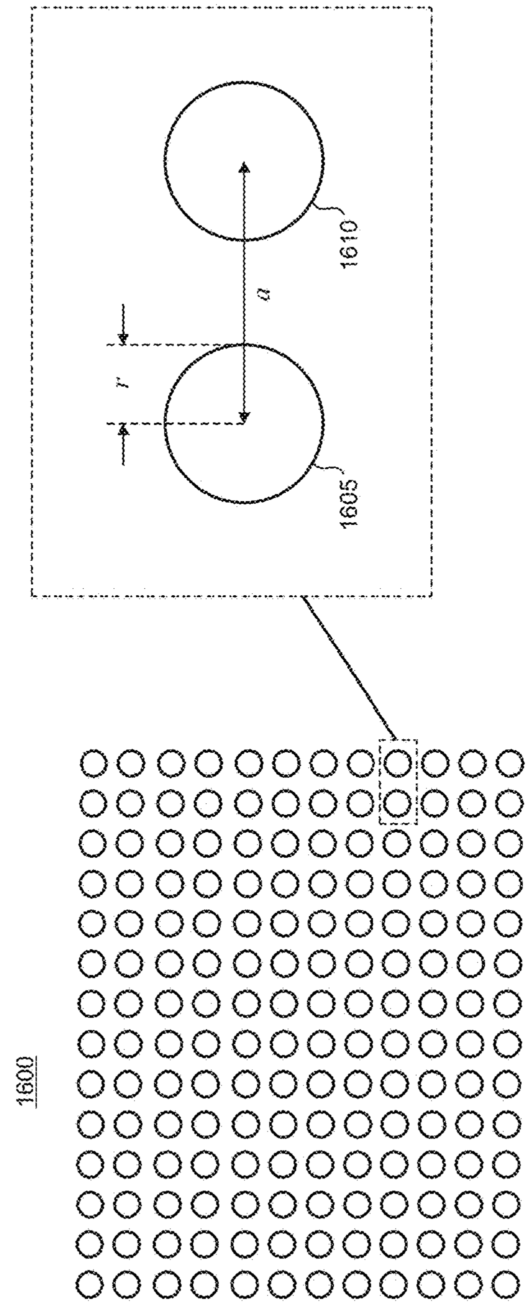
FIG. 16 shows a top view of illustrative elements in a lattice configuration as implemented in a photonic crystal nanostructure utilized for a waveguiding structure with lossless light bending.
Figure 17:
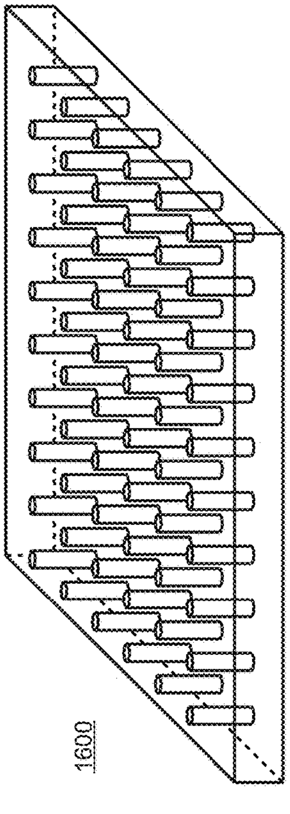
FIG. 17 shows a pictorial view of the illustrative elements in the photonic crystal nanostructure.

FIG. 16 shows a top view of illustrative elements in a lattice configuration as implemented in a photonic crystal nanostructure 1600 utilized for the waveguiding structure with lossless light bending 1210 (FIG. 12). FIG. 17 shows a pictorial view of the elements in the nanostructure 1600. The lattice is referred to as a nanostructure here as the elements and their associated geometric parameters may be described on a nanometer scale.

In this illustrative example, the elements in the photonic crystal nanostructure each have a columnar configuration with a rod shape. It is emphasized that other shapes and configurations for elements may also be utilized to meet the needs of a particular implementation. For example, in addition to column and pillar configurations, elements may be implemented using hollow or semi-hollow structures, or combinations of hollow, semi-hollow, and solid structures. Two representative elements 1605 and 1610 are shown with enlarged detail in FIG. 16. Two principal parameters including radius r and pitch a may be variably selected to manage chromatic dispersion of propagating light in the photonic crystal nanostructure. For example, and not by way of limitation, r can range from 180-250 nm and a from 50-60 nm, in typical implementations.

Figure 18:
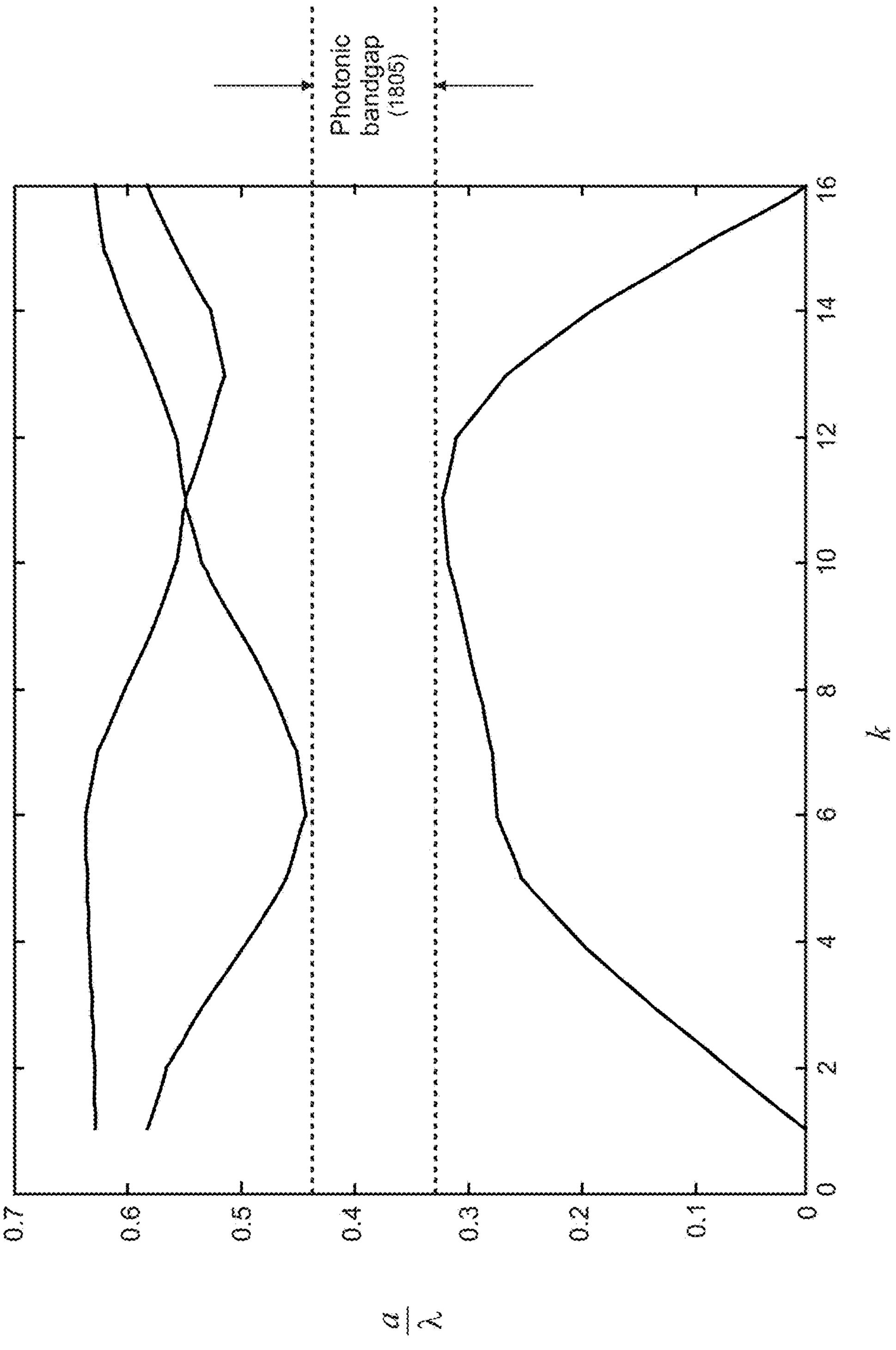
FIG. 18 is an illustrative graph showing a photonic bandgap for a photonic crystal nanostructure geometry for a range of wave vectors, k.

Light propagation in the photonic crystal nanostructure 1600 is subject to photonic bandgap effect for particular ranges of wavelengths. As shown in the graph 1800 in FIG. 18 which plots wavelength $\alpha/\lambda$ versus wave vector k (i.e., direction of photonic propagation), a photonic bandgap (indicated by reference numeral 1805) is present for a range of wave vectors for which there is no propagating mode. Thus, wavelengths within the bandgap are prevented from propagating and instead are reflected by the photonic crystal nanostructure. This bandgap effect is utilized to form the waveguides 1220 (FIG. 12) in the waveguiding structure 1210, as discussed in greater detail below.

Figure 19:
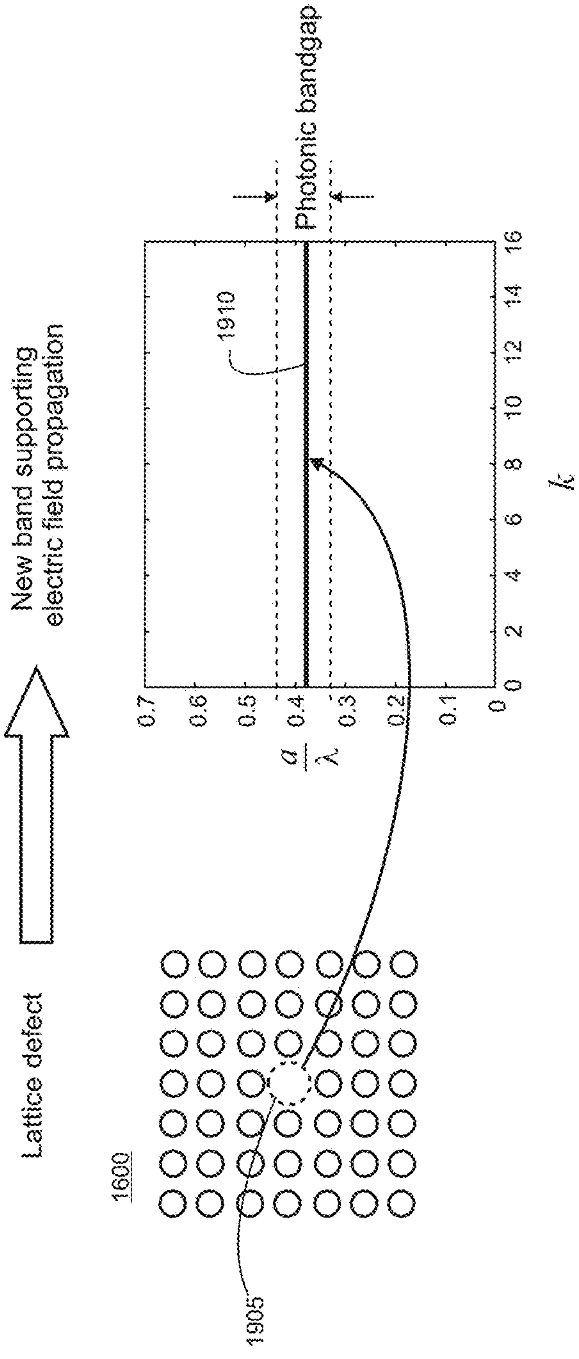
FIG. 19 shows an illustrative lattice defect that gives rise to a new band that supports photon propagation within the photonic crystal nanostructure.
Figure 20:
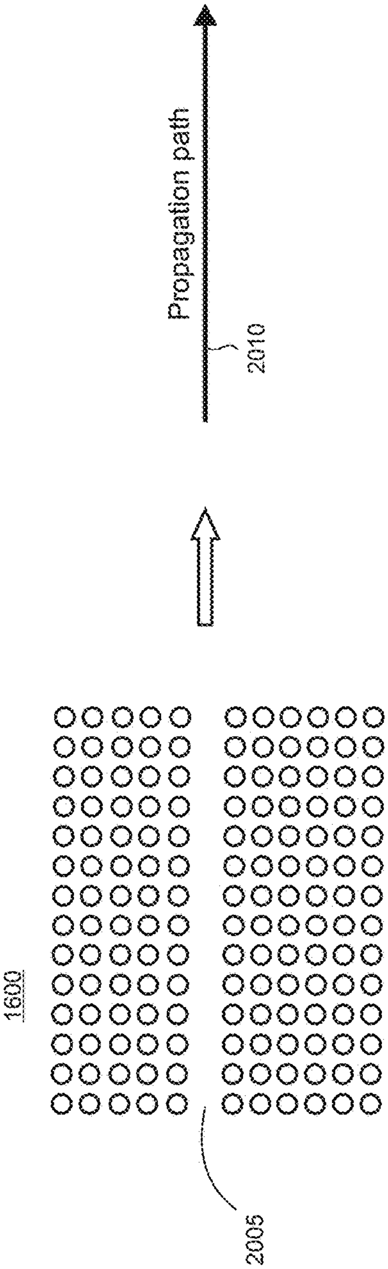
FIG. 20 shows an illustrative lattice geometry within the photonic crystal nanostructure that supports guided light propagation along a path.

The introduction of defects 1905 into the lattice of the photonic crystal nanostructure 1600, as shown in FIG. 19, gives rise to a new band 1910 that supports a propagation mode within the bandgap that may be used to guide light. For example as shown in FIG. 20, removing a row of rods (e.g., by increasing the pitch a between rows, as indicated by reference numeral 2005) forms a corresponding guided propagation path 2010 within the photonic crystal nanostructure for wavelengths operating within the bandgap.

Figure 21:
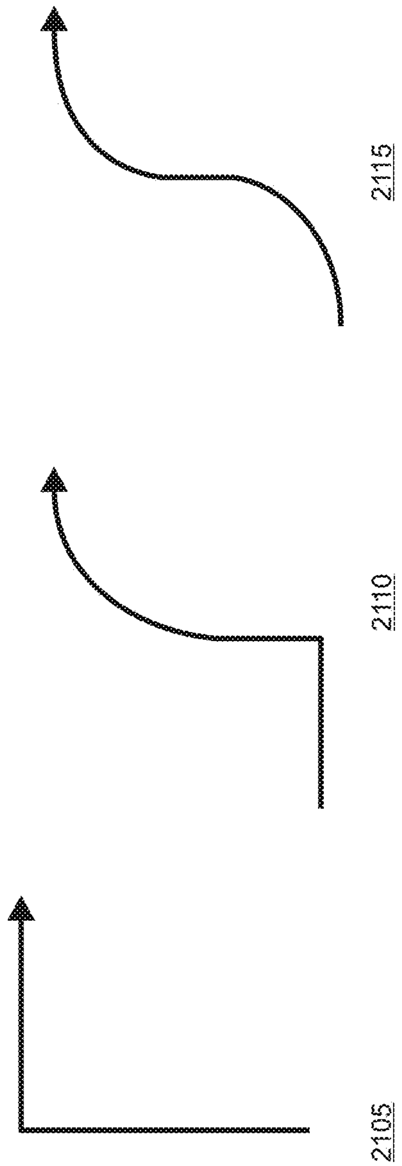
FIG. 21 shows illustrative light propagation paths within a photonic crystal nanostructure.

Utilization of the photonic crystal nanostructure for the waveguiding structure 1210 advantageously enables a wide scope of design freedom for forming waveguides. For example, as shown in FIG. 21, manipulation of the geometry of the elements in the photonic crystal nanostructure enables the formation of waveguides that can support a variety of propagation paths 2105, 2110, and 2115. A given path can include straight and curved segments and combinations of segment types. Propagation paths may utilize small bend radii to support sharp bends which may provide enhanced design and packaging flexibility in some implementations.

The waveguides implemented in the photonic crystal nanostructure are highly performant. The photonic bandgap effect strictly confines light propagation in the waveguides to thereby provide low loss and minimize crosstalk between waveguides. The combination of high optical performance and propagation path layout flexibility enables waveguides to be densely packed within the photonic crystal nanostructure which may be advantageous, particularly for example, in HMD and wearable device applications where component and system size and weight are sought to be minimized.

The interface between the input coupling and feeding system 1205 (FIG. 12) and the waveguiding structure with lossless light bending 1210 may be configured in some implementations to optimize impedance matching between the two stages. For example, the rod layout in the photonic crystal nanostructure may use a tapered configuration so that output from an optical switch in the cascaded array is efficiently coupled into a respective waveguide.

Figure 24:
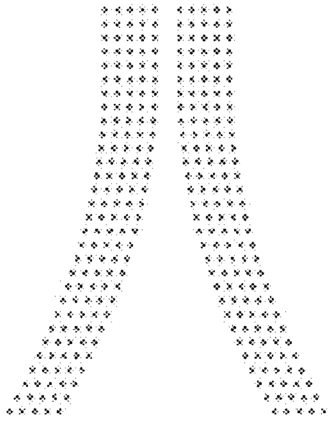
FIG. 24 shows a second illustrative tapered arrangement of elements in the photonic crystal nanostructure that provides for impedance matching between the input coupling and feeding system and the waveguiding structure with lossless light bending.
Figure 25:
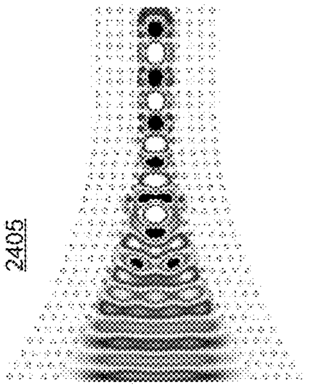
FIG. 25 shows illustrative lightwave propagation in the second tapered arrangement.
Figure 22:
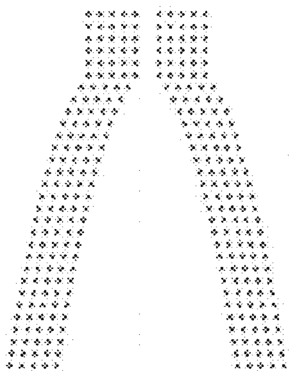
FIG. 22 shows a first illustrative tapered arrangement of elements in the photonic crystal nanostructure that provides for impedance matching between the input coupling and feeding system and the waveguiding structure with lossless light bending.
Figure 23:
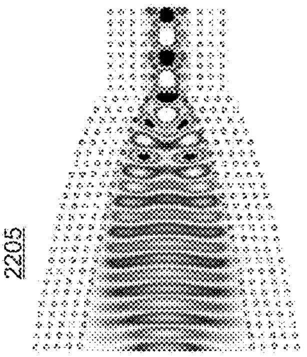
FIG. 23 shows illustrative lightwave propagation in the first tapered arrangement.

FIG. 22 shows a first illustrative tapered configuration for elements (e.g., rods) implemented as a lattice 2205 in a photonic crystal nanostructure. FIG. 23 depicts illustrative wave propagation through the tapered portion of the lattice 2205. FIG. 24 shows a second illustrative tapered configuration for elements implemented as a lattice 2405 in a photonic crystal nanostructure. FIG. 25 depicts illustrative wave propagation through the tapered portion of the lattice 2405. It may be appreciated that various other impedance matching layouts and geometries for the lattice elements may also be utilized for a given implementation to optimize the coupling efficiencies between the stages of the present integrated optical beam steering system.

Figure 26:
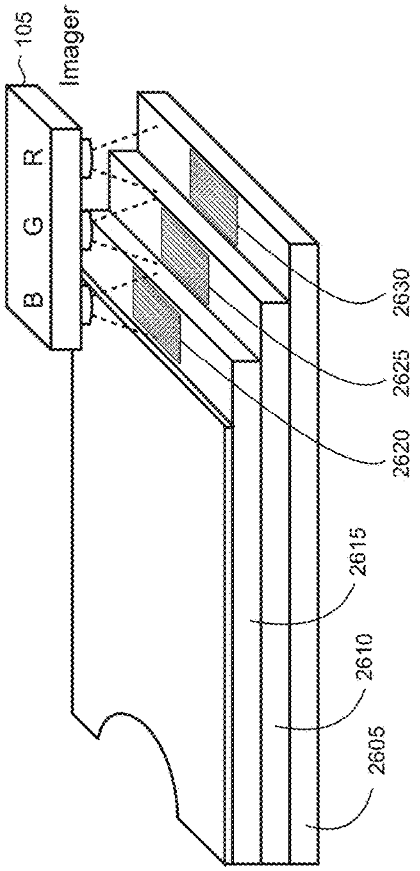
FIG. 26 shows an illustrative integrated optical beam steering system configuration using stacked plates in which each plate is responsive to a different color in the RGB color space.

The integrated optical beam steering system may be configured using multi-layer photonic crystal nanostructures in a stacked plate arrangement 2600 as shown in FIG. 26. In this illustrative example, each layer in the stack is configured to guide a single different component within the RGB color space. Thus, layer 2605 implements optical beam steering for the red wavelength, layer 2610 for green, and layer 2615 for blue. The order of the layers is arbitrary in this example, and other ordering methodologies and color spaces may be used in other implementations.

Virtual image light from the imager 105 may be coupled into the integrated optical beam steering system, by color, into each of the respective plates using respective gratings 2620, 2625, and 2630. The multi-layer stacked plate arrangement 2600 advantageously enables full-color spectrum virtual image display using a single compact module. The utilization of multiple plates for the integrated optical beam steering system may correspond to the stack 1100 shown in FIG. 11 which similarly supports full-spectrum virtual imaging through the EPE 130 (FIG. 1).

Figure 27:
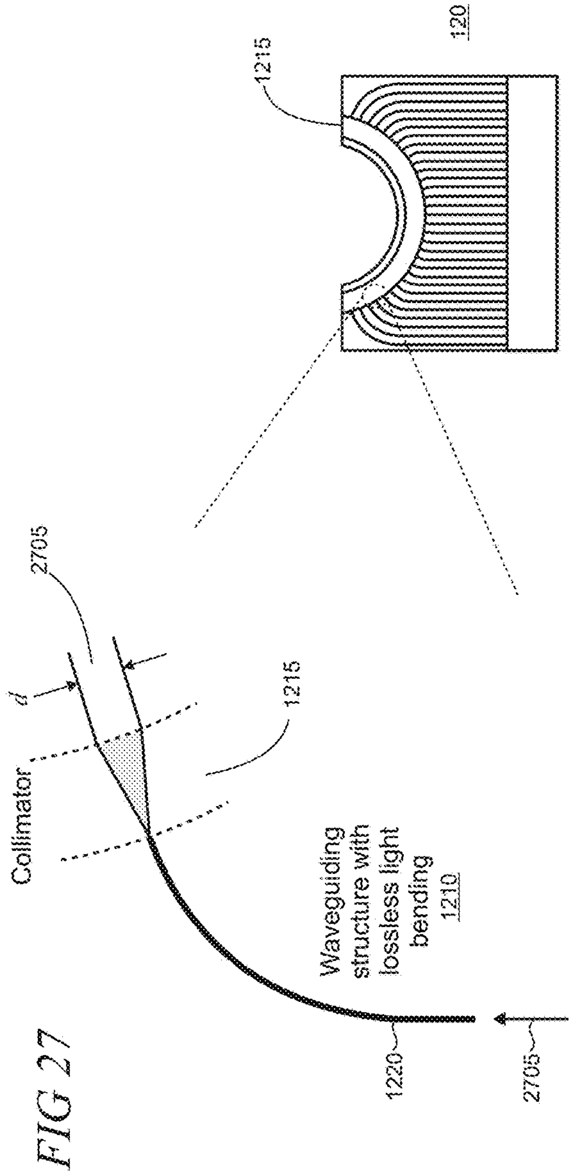
FIG. 27 shows illustrative operative and functional details of the collimator in the integrated optical beam steering system.

The collimator 1215 component of the integrated optical beam steering system is configured to receive image light from the waveguiding structure 1210 and provide fully collimated light to the in-coupling DOE (not shown), as depicted in an enlarged partial view in FIG. 27. As shown by a representative virtual image beam 2705, light exits a waveguide 1220 and is directly coupled into the collimator 1215 which expands the beam over some distance d as it propagates through it (the expansion is indicated by the shaded cone in the drawing).

The semi-circular shape of the collimator 1215 is configured to match the layout of the waveguides in the waveguiding structure 1210 which are configured with bending pathways. The collimator is further configured to present a curved output surface that is concave relative to the in-coupling DOE. Such geometry enables the collimator to provide an intermediate entrance pupil for the image beams to the in-coupling DOE that maintains a desired FOV with suitable coupling efficiency. For example, the collimator geometry is selected so that image light is incident on the in-coupling DOE within a range of angles within the TIR limits of the DOE and waveguide over the extent of the horizontal FOV to minimize reflections and leakage.

The collimator 1215 is configured to operate to provide image beam expansion and collimation across the horizontal FOV. As the image beam 2705 may be divergent in the vertical direction, a lens may be used to provide collimation and/or beam expansion in the vertical direction. For example, the lens may be configured as a cylindrical collimating lens that operates along a single axis. Alternatively, the collimator may be configured, using one or layers of deposition along one or more of its surfaces (e.g., top and/or back), as a gradient-index (GRIN) lens having a gradient refractive index to provide collimation in the vertical direction. As noted above in the description accompanying FIG. 7, beam steering in the vertical direction to the in-coupling DOE is provided by the MEMS scanner.

Figure 28:
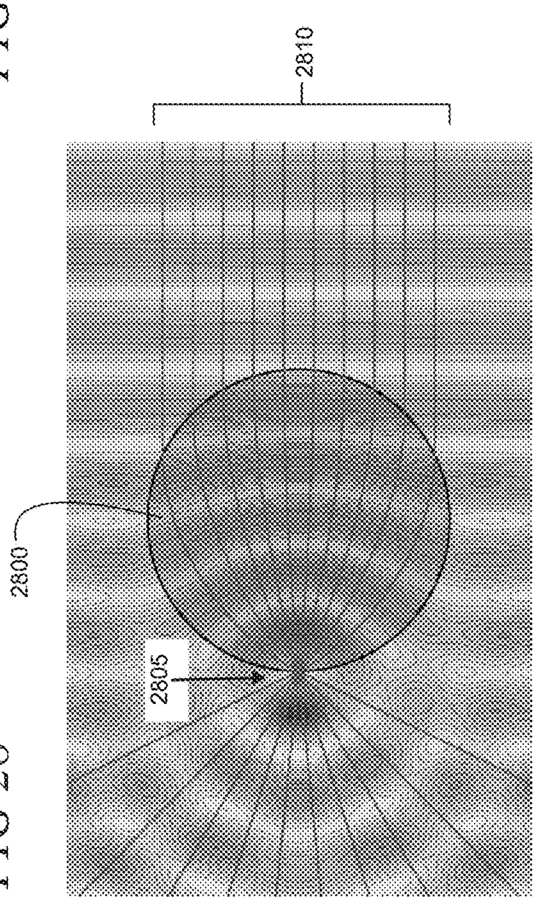
FIGS. 28 and 29 show illustrative operations of a Luneburg lens in which a point light source incident on the lens periphery is transformed to a planewave.

In this illustrative example, the collimator 1215 is implemented as a photonic crystal that is configured with similar optical properties as a Luneburg lens. As shown in FIG. 28, an illustrative Luneburg lens 2800 converts a point of light 2805 that is incident on the lens periphery into a planewave 2810.

The refractive index n of the Luneburg lens 2800 has a gradient distribution where n is maximum at the center of the lens and gradually drops for points in the lens that are farther from the center according to $$n = \sqrt{2 - \left(\frac{r}{R}\right)^2}$$

where R is the lens radius. At the edge of the lens r=R, and thus n=1. Because the refractive index at the lens surface is the same as that of the surrounding medium, no reflection occurs at the surface.

Figure 29:
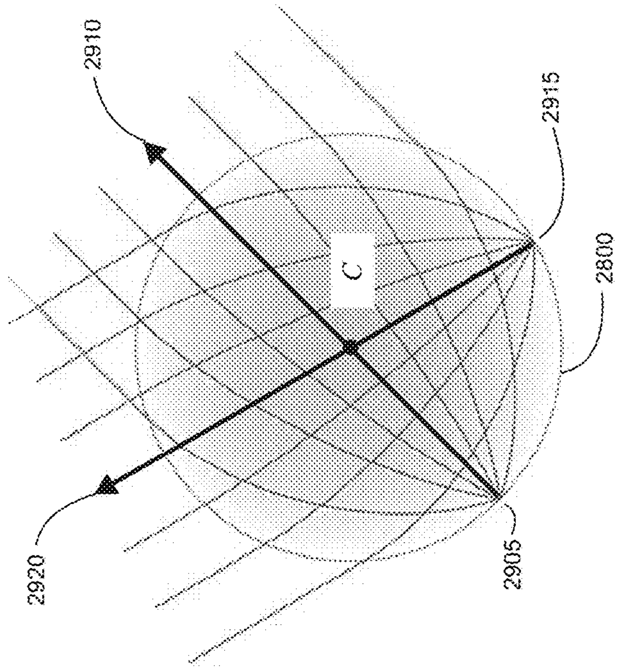

As shown in FIG. 29, each point on the periphery of the lens' diameter is mapped into a planewave having a proportional direction in which the direction of the planewave follows a line from the point of incidence to the center C. Thus, for incident image beam 2905, the lens 2800 emits a planewave in the direction of line 2910, and for incident image beam 2915, the lens emits a planewave in the direction of line 2920.

Figure 30:
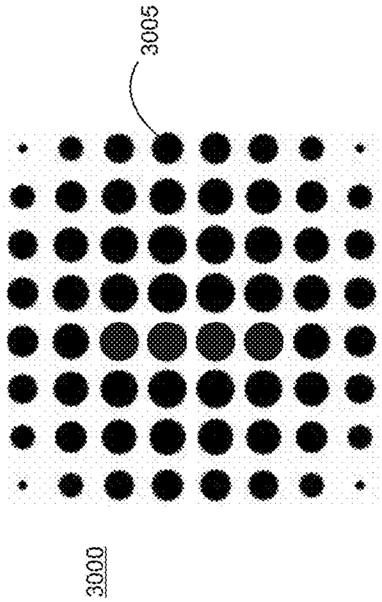
FIG. 30 shows an illustrative two-dimensional arrangement of elements in a photonic crystal nanostructure utilized to implement a lens that mimics the properties of a Luneburg lens.

The Luneburg lens 2800 shown in FIGS. 28 and 29 is fabricated from bulk glass which is typically not suitable in systems such as HMD devices where size, weight, and cost are sought to be minimized. In the present integrated optical beam steering system, the collimator 1215 (FIG. 12) is implemented using lightweight photonic crystal nanostructure using a lattice of elements 3000 such as rods (representatively indicated by reference numeral 3005), as shown in FIG. 30. The rods in the lattice are configured with varying diameters so that the collimator can mimic properties of a Luneburg lens in two dimensions.

Figure 31:
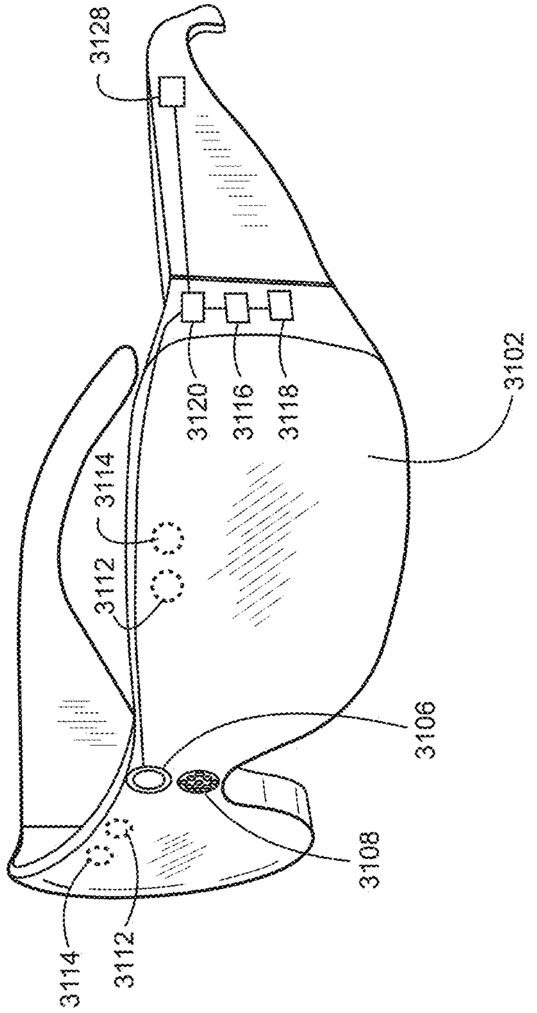
FIG. 31 is a pictorial view of an illustrative example of a virtual-reality or mixed-reality head mounted display (HMD) device.
Figure 32:
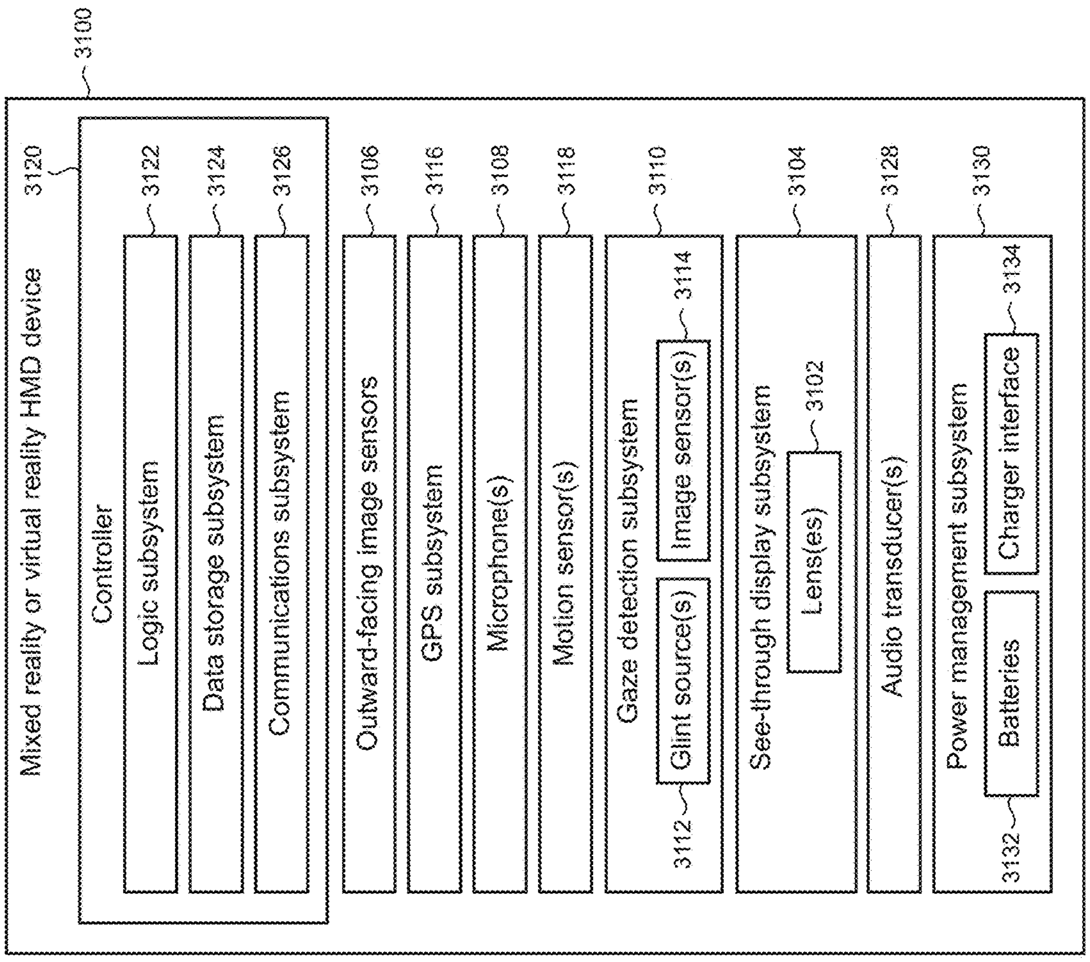
FIG. 32 shows a block diagram of an illustrative example of a virtual-reality or mixed-reality HMD device.

The integrated optical beam steering system described above may be utilized in mixed-reality or virtual-reality applications. FIG. 31 shows one particular illustrative example of a mixed-reality or virtual-reality HMD device 3100, and FIG. 32 shows a functional block diagram of the device 3100. HMD device 3100 comprises one or more lenses 3102 that form a part of a see-through display subsystem 3104, so that images may be displayed using lenses 3102 (e.g. using projection onto lenses 3102, one or more waveguide systems, such as a near-eye optical display system, incorporated into the lenses 3102, and/or in any other suitable manner). HMD device 3100 further comprises one or more outward-facing image sensors 3106 configured to acquire images of a background scene and/or physical environment being viewed by a user, and may include one or more microphones 3108 configured to detect sounds, such as voice commands from a user. Outward-facing image sensors 3106 may include one or more depth sensors and/or one or more two-dimensional image sensors. In alternative arrangements, as noted above, a mixed-reality or virtual-reality display system, instead of incorporating a see-through display subsystem, may display mixed-reality or virtual-reality images through a viewfinder mode for an outward-facing image sensor.

The HMD device 3100 may further include a gaze detection subsystem 3110 configured for detecting a direction of gaze of each eye of a user or a direction or location of focus, as described above. Gaze detection subsystem 3110 may be configured to determine gaze directions of each of a user's eyes in any suitable manner. For example, in the illustrative example shown, a gaze detection subsystem 3110 includes one or more glint sources 3112, such as infrared light sources, that are configured to cause a glint of light to reflect from each eyeball of a user, and one or more image sensors 3114, such as inward-facing sensors, that are configured to capture an image of each eyeball of the user. Changes in the glints from the user's eyeballs and/or a location of a user's pupil, as determined from image data gathered using the image sensor(s) 3114, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 3110 may have any suitable number and arrangement of light sources and image sensors. In some implementations, the gaze detection subsystem 3110 may be omitted.

The HMD device 3100 may also include additional sensors. For example, HMD device 3100 may comprise a global positioning system (GPS) subsystem 3116 to allow a location of the HMD device 3100 to be determined. This may help to identify real-world objects, such as buildings, etc. that may be located in the user's adjoining physical environment.

The HMD device 3100 may further include one or more motion sensors 3118 (e.g., inertial, multi-axis gyroscopic, or acceleration sensors) to detect movement and position/orientation/pose of a user's head when the user is wearing the system as part of a mixed-reality or virtual-reality HMD device. Motion data may be used, potentially along with eye-tracking glint data and outward-facing image data, for gaze detection, as well as for image stabilization to help correct for blur in images from the outward-facing image sensor(s) 3106. The use of motion data may allow changes in gaze direction to be tracked even if image data from outward-facing image sensor(s) 3106 cannot be resolved.

In addition, motion sensors 3118, as well as microphone(s) 3108 and gaze detection subsystem 3110, also may be employed as user input devices, such that a user may interact with the HMD device 3100 via gestures of the eye, neck and/or head, as well as via verbal commands in some cases. It may be understood that sensors illustrated in FIGS. 31 and 32 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 3100 can further include a controller 3120 such as one or more processors having a logic subsystem 3122 and a data storage subsystem 3124 in communication with the sensors, gaze detection subsystem 3110, display subsystem 3104, and/or other components through a communications subsystem 3126. The communications subsystem 3126 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 3124 may include instructions stored thereon that are executable by logic subsystem 3122, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 3100 is configured with one or more audio transducers 3128 (e.g., speakers, earphones, etc.) so that audio can be utilized as part of a mixed-reality or virtual-reality experience. A power management subsystem 3130 may include one or more batteries 3132 and/or protection circuit modules (PCMs) and an associated charger interface 3134 and/or remote power interface for supplying power to components in the HMD device 3100.

It may be appreciated that the HMD device 3100 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 33:
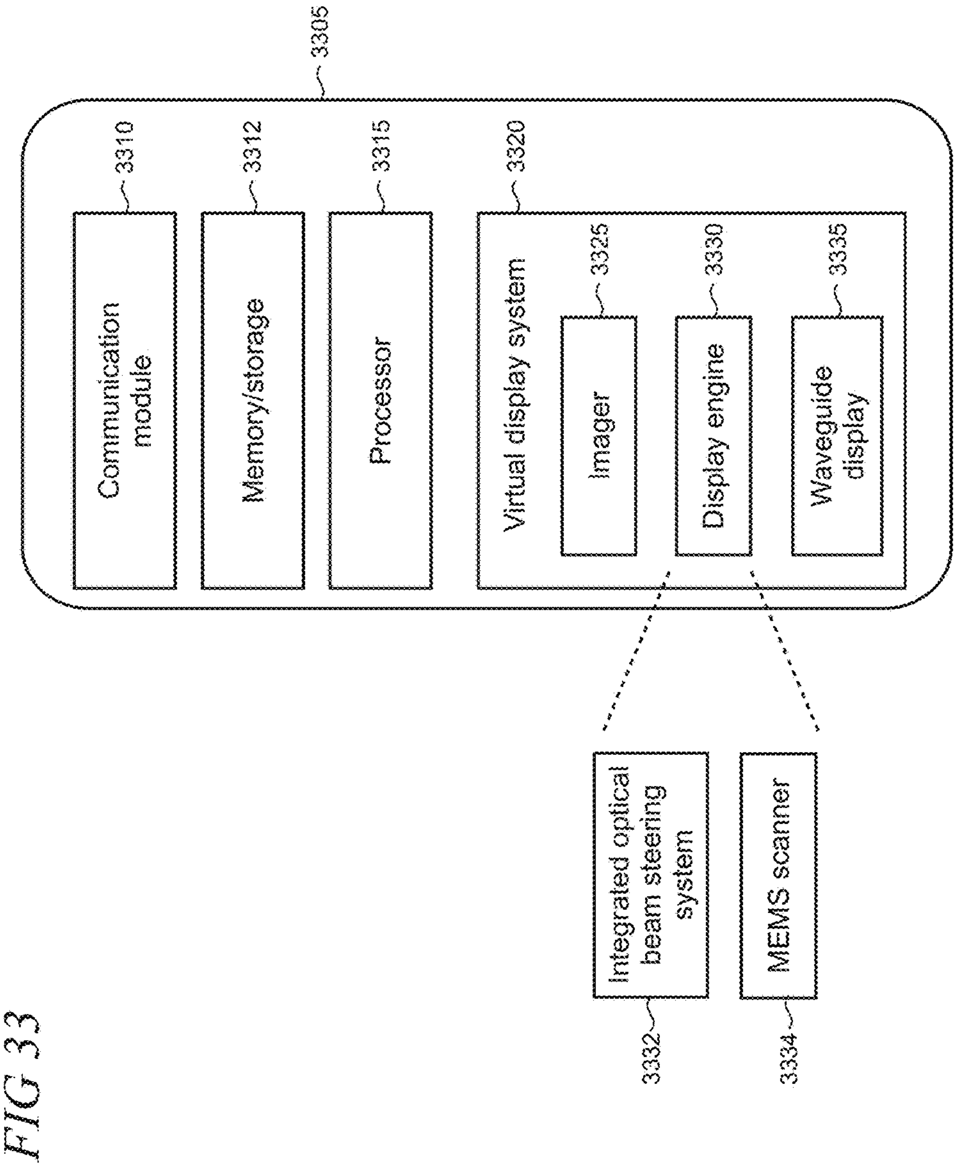
FIG. 33 shows a block diagram of an illustrative electronic device that incorporates an integrated optical beam steering system.

As shown in FIG. 33, the integrated optical beam steering system can be used in a mobile or portable electronic device 3300, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 3300 includes a housing 3305 to house a communication module 3310 for receiving and transmitting information from and to an external device, or a remote system or service (not shown). Memory and data storage (collectively indicated by reference numeral 3312) is also supported on the portable device.

The portable device 3300 may also include a processor 3315 using one or more central processing units and/or graphics processors for processing stored and/or received data to generate virtual images. A virtual display system 3320 is configured to support viewing of images. The virtual display system can include a micro-display or an imager 3325, a display engine 3330, and a waveguide display 3335 which may include an EPE. The processor 3315 may be operatively connected to the imager 3325 to provide image data, such as video data so that images may be displayed using the display engine 3330 and waveguide display 3335. The display engine includes an integrated optical beam steering system 3332 and MEMS scanner 3334, as described above.

Various exemplary embodiments of the present integrated optical beam steering system are now presented by way of illustration and not as an exhaustive list of all embodiments. An example includes an optical waveguiding structure, comprising: a photonic crystal nanostructure comprising a plurality of nanoelements at least partially arranged in a lattice configuration and having one or more input surfaces and a concave output surface, parameters of the nanoelements being selected to give rise to a photonic bandgap for a predetermined range of wavelengths in which there is no propagating mode; a plurality of waveguides disposed in the nanostructure, wherein each waveguide comprises a negative space formed by an absence of nanoelements in the lattice along a path to generate a propagating band within the photonic bandgap; a plurality of inputs to the respective plurality of waveguides, the inputs being disposed on the one or more input surfaces of the nanostructure wherein light in the propagating band received at an input propagates in a respective waveguide in total internal reflection; and a plurality of outputs from the respective plurality of waveguides, wherein one or more of the waveguides include paths having curved portions, and each of the waveguide paths is located in the nanostructure such that each of the outputs is configured normal to the concave output surface.

In another example, the photonic crystal nanostructure is configured in a plate arrangement. In another example, the optical waveguiding structure further comprises a stack of plates, each plate in the stack being adapted for guiding one or more different predetermined wavelengths of light. In another example, the photonic crystal nanostructure adjacent to the input surface includes nanoelements in a taper configuration to provide impedance matching for optical input signals. In another example, the nanoelements include rods that project from a photonic crystal nanostructure substrate, holes in the substrate, or a combination of rods and holes. In another example, the selected parameters include diameter, height, or pitch of the rods. In another example, the input surface includes one or more diffractive gratings for in-coupling light into the waveguiding structure.

A further example includes an optical routing system, comprising: at least one optical switch configured to provide an optical input to the routing system for an optical signal; a first plurality of optical switches configured to provide a plurality of optical outputs from the routing system; a second plurality of optical switches arranged in a multi-level binary tree cascaded array between the input optical switch and the output optical switches, in which outputs of optical switches are coupled to inputs of optical switches at each successive level in the array, wherein each of the optical switches in the optical routing system includes a Mach-Zehnder interferometer that is located between two directional optical couplers and each switch is configured with two pathways through the Mach-Zehnder interferometer and the optical couplers, wherein each optical switch includes a power source configured to apply a voltage to a pathway in the Mach-Zehnder interferometer to thereby impart a phase change in light propagating in the pathway with the applied voltage, and wherein the optical routing system is controllable through operation of the power sources to switch the input optical signal to the routing system to any of the optical outputs from the routing system.

In another example, each optical switch comprises a 2×2 optical switch including two input ports and two output ports. In another example, the directional couplers are 3 dB couplers. In another example, the optical routing system further includes a controller configured to transmit control signals to the power sources. In another example, the controller is operated so that the optical routing system performs as a switch fabric. In another example, one or more of the optical switches is operated as variable attenuator. In another example, outputs are spatially arranged in a row.

A further example includes an optical collimator configured to perform optical collimation for propagating light within a plane, comprising: a substrate extending along the plane comprising a photonic crystal nanostructure; a semi-circular portion of the substrate that is configured as an input surface to the collimator; a portion of the substrate configured as an output surface of the collimator; and a plurality of nanoelements extending from the substrate and configured with varying geometries to provide a gradient refractive index n at any point r in the semi-circular portion in which $$n = \sqrt{2 - \left(\frac{r}{R}\right)^2}$$

where R is the radius of the semi-circular portion, such that uncollimated light incident on the input is converted to a collimated planewave and is output from the output portion of the collimator.

In another example, the nanoelements are rods or holes and the varying geometries comprise varying diameters. In another example, the nanoelements are configured so that the optical collimator operates as a Luneburg lens in two dimensions. In another example, the output surface is concave. In another example, the photonic crystal nanostructure has a planar configuration. In another example, the nanoelements are configured to perform beam expansion on the incident light.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. An optical waveguiding structure, comprising:

a photonic crystal nanostructure comprising a plurality of nanoelements at least partially arranged in a lattice configuration and having one or more input surfaces and a concave output surface, parameters of the nanoelements being selected to give rise to a photonic bandgap for a predetermined range of wavelengths in which there is no propagating mode;

a plurality of waveguides disposed in the nanostructure, wherein each waveguide comprises a negative space formed by an absence of nanoelements in the lattice along a path to generate a propagating band within the photonic bandgap;

a plurality of inputs to the respective plurality of waveguides, the inputs being disposed on the one or more input surfaces of the nanostructure wherein light in the propagating band received at an input propagates in a respective waveguide in total internal reflection; and a plurality of outputs from the respective plurality of waveguides, wherein one or more of the waveguides include paths having curved portions, and each of the waveguide paths is located in the nanostructure such that each of the outputs is configured normal to the concave output surface.

2. The optical waveguiding structure of claim 1 in which the photonic crystal nanostructure is configured in a plate arrangement.

3. The optical waveguiding structure of claim 1 further comprising a stack of plates, each plate in the stack being adapted for guiding one or more different predetermined wavelengths of light.

4. The optical waveguiding structure of claim 1 in which a portion of the photonic crystal nanostructure adjacent to the input surface includes nanoelements in a taper configuration to provide impedance matching for optical input signals.

5. The optical waveguiding structure of claim 1 in which the nanoelements include rods that project from a photonic crystal nanostructure substrate, holes in the substrate, or a combination of rods and holes.

6. The optical waveguiding structure of claim 5 in which the nanoelements include rods and the selected parameters of the rods include diameter, height, or pitch.

7. The optical waveguiding structure of claim 1 in which the input surface includes one or more diffractive gratings for in-coupling light into the waveguiding structure.

* * * * *